US012633977B2

(12) United States Patent
Li et al.

(10) Patent No.: US 12,633,977 B2
(45) Date of Patent: May 19, 2026

(54) COMMUNICATION METHOD AND DEVICE THEREOF

(71) Applicant: Samsung Electronics Co., Ltd., Suwon-si (KR)

(72) Inventors: Bozhi Li, Beijing (CN); He Wang, Beijing (CN); Jeongheum Lee, Suwon-si (KR); Taekhoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 215 days.

(21) Appl. No.: 18/446,941

(22) Filed: Aug. 9, 2023

(65) Prior Publication Data

US 2024/0063864 A1 Feb. 22, 2024

Related U.S. Application Data

(63) Continuation of application No. PCT/KR2023/011317, filed on Aug. 2, 2023.

(30) Foreign Application Priority Data

| | | |
|---|---|---|
| Aug. 9, 2022 | (CN) | ........................ 202210951453.7 |
| Apr. 7, 2023 | (CN) | ........................ 202310369632.4 |
| Jun. 28, 2023 | (CN) | ........................ 202310779144.0 |

(51) Int. Cl.
*H04B 7/06* (2006.01)

(52) U.S. Cl.
CPC ......... *H04B 7/0617* (2013.01); *H04B 7/0639* (2013.01)

(58) Field of Classification Search
CPC ............................. H04B 7/0617; H04B 7/0639
See application file for complete search history.

(56) References Cited

U.S. PATENT DOCUMENTS

| | | | |
|---|---|---|---|
| 10,707,976 B1 * | 7/2020 | Derat | ..................... H04B 17/12 |
| 11,129,041 B2 | 9/2021 | Chen et al. | |
| 11,251,840 B1 | 2/2022 | Wen et al. | |
| 11,381,322 B2 | 7/2022 | Abadie | |

(Continued)

FOREIGN PATENT DOCUMENTS

| | | |
|---|---|---|
| CN | 113271155 A | 8/2021 |
| KR | 10-2021-0085457 A | 7/2021 |

(Continued)

OTHER PUBLICATIONS

3GPP TS 38.213 V17.6.0 (Jun. 2023) 3rd Generation Partnership Project; Technical Specification Group Radio Access Network; NR Physical layer procedures for control (Release 17).

(Continued)

*Primary Examiner* — Rahel Guarino
(74) *Attorney, Agent, or Firm* — Nixon & Vanderhye P.C.

(57) ABSTRACT

Communication methods and devices thereof. A method performed by a User Equipment (UE) in a communication system may include obtaining a first message when the UE is in a connected state, wherein the first message comprises beamlock related information that can be applied in a non-connected state, and performing a corresponding beamlock related operation based on the beamlock related information when the UE is in the non-connected state.

18 Claims, 24 Drawing Sheets obtaining a first message when a UE is in a connected state, wherein the first message includes beamlock related information that can be applied in a non—connected state ⟶ S701 performing a corresponding beamlock related operation based on the beamlock related information when the UE is in the non—connected state ⟶ S702

(56) References Cited

U.S. PATENT DOCUMENTS

| | | |
|---|---|---|
| 2020/0367144 A1 | 11/2020 | Rofougaran et al. |
| 2022/0232474 A1 | 7/2022 | Xu et al. |
| 2022/0312532 A1 | 9/2022 | Rugeland et al. |
| 2023/0106320 A1 | 4/2023 | Haustein et al. |

FOREIGN PATENT DOCUMENTS

| | | |
|---|---|---|
| WO | WO 2019/194725 A | 10/2019 |
| WO | WO2019194725 A1 | 10/2019 |
| WO | WO 2022-030950 A1 | 2/2022 |
| WO | WO 2022/146656 A1 | 7/2022 |

OTHER PUBLICATIONS

3GPP TS 38.101-2 V18.2.0 (Jun. 2023)3rd Generation Partnership Project; Technical Specification Group Radio Access Network NR; User Equipment (UE) radio transmission and reception.

3GPP TSG RAN Meeting #98e RP-223527 Electronic Meeting, Dec. 12-16, 2022 Requirement for NR frequency range 2 (FR2) multi-Rx chain DL reception.

3GPP TSG-RAN Meeting #98-e RP-223112 Electronic meeting, Dec. 12-16, 2022 Enhancement of UE TRP (Total Radiated Power) and TRS (Total Radiated Sensitivity) requirements and test methodologies for FR1 (NR SA and EN-DC).

3GPP TSG RAN Meeting #98-e RP-222909 Electronic Meeting, Dec. 12-16, 2022 NR RF requirements enhancement for frequency range 2 (FR2), Phase 3.

3GPP TSG-RAN WG4 Meeting # 107 R4-2310397 Incheon, Korea, May 22-May 26, 2023 Change Request.

3GPP TSG-RAN WG4 Meeting # 107 R4-2310259 Incheon Korea, May 22-May 26, 2023 Beam Correspondence requirement applicability.

3GPP TSG-RAN WG4 Meeting #107 R4-2309901 Incheon, KR, May 22-May 26, 2023 Anechoic Chamber (AC) test methodology.

3GPP TR 38.891 V0.5.0 (Aug. 2022) 3rd Generation Partnership Project; Technical Specification Group Radio Access Network R-2308803.

3GPP TSG-RAN WG4 Meeting # 107 R4-2307940 Incheon, Korea, May 22-May 26, 2023 Change Request.

3GPP TSG-RAN WG4 Meeting #107 R4-2307939 Incheon, KR, May 22-May 26, 2023; Discussion on RF requirements for simultaneous multi-panel operation for FR2 HST.

3GPP TSG-RAN WG4 Meeting #107 R4-2307935 Incheon, KR, May 22-May 26, 2023 Discussion on FR2 beam correspondence test in initial access.

3GPP TSG-RAN WG4 Meeting #107 R4-2307934 Incheon, KR, May 22-May 26, 2023 Discussion on FR2 Beam correspondence requirement in initial access.

3GPP TSG-RAN WG4 Meeting #107 R4-2307933 Incheon, KR, May 22-May 26, 2023 on measurement grid for multi-RX DL 2AoA spherical coverage.

3GPP TSG-RAN WG4 Meeting #107 R4-2307932 Incheon, KR, May 22-May 26, 2023 Further discussion on FR2 Multi-RX DL 2AoA spherical coverage.

3GPP TSG-RAN WG4 Meeting #106bis-e R4-2304827 Online, Apr. 17-Apr. 26, 2023 Further reply LS on testability for beam correspondence in initial access.

3GPP TSG-RAN WG4 Meeting #106bis-e R4-2304826 Online, Apr. 17-Apr. 26, 2023 Thoughts on breakthrough of FR2 beam correspondence in initial access.

3GPP TSG-RAN WG4 Meeting #106bis-e R4-2304825 Online, Apr. 17-Apr. 26, 2023 on multi-RX DL RF test in DL polarization and DCI schemes aspects.

3GPP TSG-RAN WG4 Meeting # 106 R4-2303708 Athens, Greece, Feb. 27-Mar. 3, 2023 WF on NR FR2 Multi-Rx chain DL reception.

3GPP TSG-RAN WG4 Meeting # 106 R4-2302923 Athens, Greece, Feb. 27-Mar. 3, 2023 WF for FR2 OTA test enhancement SI.

3GPP TSG-RAN WG4 Meeting #106 R4-2300989 Athens, Greece, Feb. 27-Mar. 3, 2023 Discussion on how to achieve maximum output power in initial access.

3GPP TSG-RAN WG4 Meeting #106 R4-2300988 Athens, Greece, Feb. 27-Mar. 3, 2023 Discussion on maximum AoA angular separation for Multi-RX UE RF testing.

3GPP TSG-RAN WG4 Meeting #106 R4-2300987 Athens, Greece, Feb. 27-Mar. 3, 2023 Discussion on FR2 Multi-RX DL UE RF requirements.

3GPP TSG-RAN WG4 Meeting #105 R4-2218560 Toulouse, France, Nov. 14-Nov. 18, 2022 Discussion on test setup for 2AoA RF test.

3GPP TSG-RAN WG4 Meeting #105 R4-2218559 Toulouse, France, Nov. 14-Nov. 18, 2022 FR2 beam correspondence test for initial access.

3GPP TSG-RAN WG4 Meeting #106bis-e R4-2304824 Online, Apr. 17-Apr. 26, 2023 FR2 Multi-RX 2AoA spherical coverage simulation and requirements.

3GPP TSG-RAN WG4 Meeting #105 R4-2218558 Toulouse, France, Nov. 14-Nov. 18, 2022 FR2 beam correspondence requirement for initial access.

3GPP TSG-RAN WG4 Meeting #105 R4-2218557 Toulouse, France, Nov. 14-Nov. 18, 2022 RF requirements for FR2 simultaneous DL reception from different directions.

3GPP TSG-RAN WG4 Meeting #105 R4-2218556 Toulouse, France, Nov. 14-Nov. 18, 2022 System and UE assumptions for FR2 simultaneous DL reception from different directions.

3GPP TSG-RAN WG4 Meeting #104-Bis-e R4-2217732 Electronic Meeting, Oct. 10-19, 2022 WF on System parameter assumption, UE architecture and test setup.

3GPP TSG-RAN WG4 Meeting #104bis-e R4-2215703 Electronic Meeting, Oct. 10-Oct. 19, 2022 Discussion on full degree of rotation freedom with 2AoA.

3GPP TSG-RAN WG4 Meeting #104bis-e R4-2215702 Electronic Meeting, Oct. 10-Oct. 19, 2022 FR2 beam correspondence requirement and test for random access.

3GPP TSG-RAN WG4 Meeting #104bis-e R4-2215701 Electronic Meeting, Oct. 10-Oct. 19, 2022 System assumption and UE assumption for FR2 simultaneous DL reception from different directions.

3GPP TSG-RAN WG4 Meeting # 104-e R4-2214457 Electronic Meeting, Aug. 2022 WF on FR2 multi-Rx chain DL reception.

3GPP TSG-RAN WG4 Meeting #104-e R4-2214454 <Electronic Meeting>, Aug. 15-26, 2022 WF on BC in RRC _Inactive and initial access.

3GPP TSG-RAN WG4 Meeting #104-e R4-2211993 Electronic Meeting, Aug. 15-Aug. 26, 2022 Requirements for FR2 simultaneous DL reception from different directions.

3GPP TSG-RAN WG4 Meeting #104-e R4-2211992 Electronic Meeting, Aug. 15-Aug. 26, 2022 FR2 beam correspondence for RRC Inactive and initial access.

3GPP TSG-RAN WG4 Meeting #104-e R4-2211991 Electronic Meeting, Aug. 15-Aug. 26, 2022 Considerations on FR2 multiple AoA test.

3GPP TR 38.871 V0.2.0 (Apr. 2023) Study on NR frequency range 2 (FR2) Over-the-Air (OTA) testing enhancements.

PCT Written Opinion dated Nov. 17, 2023 for PCT/KR2023/011317.

PCT International Search Report dated Nov. 17, 2023 for PCT/KR2023/011317.

Apple, 'CR to 38.884 on finalizing the study outcomes (Rel-18)', R4-2211332, 3GPP TSG RAN4 Meeting #103-e, e-Meeting, May 27, 2022.

3GPP; TSG RAN; SGS; Special conformance testing functions for User Equipment (UE) (Release 17). 3GPP TS 38.509 V17.0.0, Apr. 7, 2022.

Samsung, 'Discussion on FR2 test time reduction', R4-2112577, 3GPP TSG RAN4 Meeting #100-e, e-Meeting, Aug. 6, 2021.

Partial Supplementary European Search Report dated Sep. 17, 2025 for EP Application No. 23852865.7.

"3rd Generation Partnership Project; 3,4,7, Technical Specification Group Radio Access 11,12 Network; 5GS; Special conformance testing functions for User Equipment (UE) (Release 17)"; 61 pages; Apr. 7, 2022.

(56)           References Cited

OTHER PUBLICATIONS

Extended European Search Report dated Dec. 8, 2025 for EP
Application No. 23852865.7.

* cited by examiner

116

305

310
RF TRANSCEIVER

330
SPEAKER

325
RX PROCESSING CIRCUIT

320
MICROPHONE

315
TX PROCESSING CIRCUIT 345
1/0 IF

340
PROCESSOR

350
INPUT

355
DISPLAY

360
MEMORY

361
OPERATING SYSTEM

362
APPLICATION obtaining a first message when a UE is in a connected state, wherein the first message includes beamlock related information that can be applied in a non—connected state ⟋ S701 performing a corresponding beamlock related operation based on the beamlock related information when the UE is in the non—connected state ⟋ S702

PRACH power

FIG. 9 determining anchor directions of multiple angle of arrivals for a user equipment, wherein each angle of arrival corresponds to a reference signal — S1401 obtaining, based on the anchor directions, a spherical coverage formed by each reference signal relative to the user equipment — S1402

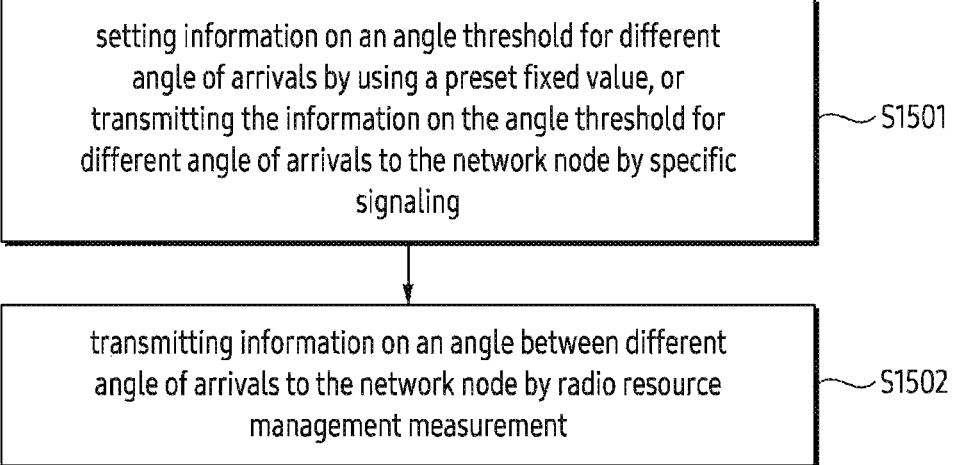

setting information on an angle threshold for different angle of arrivals by using a preset fixed value, or transmitting the information on the angle threshold for different angle of arrivals to the network node by specific signaling ~S1501 transmitting information on an angle between different angle of arrivals to the network node by radio resource management measurement ~S1502

FIG. 15

TRP1 of antenna transmitting mode 1    – – – – – – – – –

TRP2 of antenna transmitting mode 2    —————— envelope combined TRP    ——————

COMMUNICATION METHOD AND DEVICE THEREOF

RELATED APPLICATIONS

This application is a continuation application of international application No. PCT/KR2023/011317, filed on Aug. 2, 2023, which is based on and claims the benefit of Chinese Patent Application No. 202210951453.7 filed on Aug. 9, 2022 (845B); Chinese Patent Application No. 202310369632.4 filed on Apr. 7, 2023 (025C); and Chinese Patent Application No. 202310779144.0 filed on Jun. 28, 2023 (9498), the disclosures of each of which are hereby entirely incorporated by reference herein.

BACKGROUND

Field

Certain example embodiments relate to a field of communication technology and for example, to a communication method performed by a user equipment in a communication system, a communication method performed by a network node, a user equipment, a network node and/or a computer readable storage medium.

Description of Related Art

In order to meet the increasing demand for wireless data communication services since the deployment of 4G communication systems, efforts have been made to develop improved 5G or pre-5G communication systems. Therefore, 5G or pre-5G communication systems are also called "Beyond 4G networks" or "Post-LTE systems".

In order to achieve a higher data rate, 5G communication systems are implemented in higher frequency (millimeter wave, e.g., mmWave) bands, e.g., 60 GHz bands. In order to reduce propagation loss of radio waves and increase transmission distances, technologies such as beam forming, massive multiple-input multiple-output (MIMO), full-dimensional MIMO (FD-MIMO), array antenna, analog beam forming and large-scale antenna techniques are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid FSK and QAM modulation (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

SUMMARY

Certain example embodiments are able to solve at least one of the technical defects in the existing communication methods to better meet the requirement of communication.

According to certain example embodiments, a method performed by a user equipment (UE) in a communication system is proposed, which may include: obtaining a first message when the UE is in a connected state, wherein the first message includes beamlock related information that can be applied in a non-connected state; and performing a corresponding beamlock related operation based on the beamlock related information when the UE is in the non-connected state.

The beamlock related information may include at least one of: an indication message for maintaining, activating or de-activating the beamlock; duration information for maintaining or activating the beamlock; time delay information for activating or de-activating the beamlock; a message indicating in which state the UE maintains or activates the beamlock; information indicating a transmitting power of an uplink signal in the non-connected state; information of the uplink signal in the non-connected state; and a transmission running time of the uplink signal in the non-connected state.

The duration information may indicate a duration after the beamlock is activated.

The time delay information may indicate a time period from the moment when the UE receives the first message in the connected state to the moment when the beamlock is activated or de-activated, or a time period from the moment when the UE enters into the non-connected state to the moment when the beamlock is activated or de-activated.

The message indicating in which state the UE maintains or activates the beamlock may include at least one of: a message indicating that the beamlock is maintained or activated in a case of UE entering into the non-connected state; a message indicating that the beamlock is activated in a case of the UE receiving a particular command.

The message indicating that the beamlock is maintained or activated in the case of entering into the non-connected state may include at least one of: a message indicating that the beamlock is maintained or activated in a case of entering into an inactive state; a message indicating that the beamlock is maintained or activated in a case of entering into an idle state.

The information indicating the transmitting power of the uplink signal in the non-connected state may include at least one of: a maximum transmitting power of the UE; a configured maximum transmitting power; an immediate transmitting power of the UE when the UE receives the first message; and an immediate transmitting power of the UE when the UE performs activating the beamlock.

Alternatively, a beam for performing the beamlock related operation may include: a beam the UE is using at the time of receiving the first message, or a beam the UE is using at the time of performing the beamlock related operation.

The beamlock related operation may include at least one of: an operation of activating the beamlock; an operation of de-activating the beamlock; an operation of maintaining the beamlock.

The operation of maintaining the beamlock may include: performing the beamlock operation when the UE receives the first message; maintaining the same beamlock operation as in the connected state when the UE is in the non-connected state.

The timing for performing the beamlock related operation may include at least one of: when the UE receives the first message; when the UE transmits an uplink signal for the first time in a next non-connected state; when the UE transmits a predefined number of uplink signals in the next non-connected state; when the UE detects that a transmitting power of the uplink signal reaches a configured maximum transmitting power; and when the UE reaches a predefined time delay or time delay information for activating the beamlock in the first message.

The timing for de-activating the beamlock operation may include at least one of: when the UE receives a beamlock de-activation message, when the UE re-enters into the connected state, when the UE receives an msg2 message or an msg4 message, when the UE reaches a predefined beam-lock duration or duration information for maintaining or activating the beamlock in the first message, and when the UE reaches a predefined time delay or time delay information for de-activating the beamlock in the first message.

The method may include activating the beamlock when transmitting an uplink signal for the first time or when transmitting uplink signals for a preset number of times in a next non-connected state, or de-activating the beamlock after entering into the connected state again.

The method may include: transmitting an uplink signal to the network node when the UE is the non-connected state; adjusting the transmitting power of the UE upwards (power ramping) in a case that no acknowledgement response message for the uplink signal is received from the network node, transmitting an uplink signal to the network node based on the adjusted transmitting power.

The transmitting of the uplink signal to the network node may include transmitting the uplink signal to the network node according to a transmitting power corresponding to a maximum preambleReceivedTargetPower parameter.

The adjusting of the transmitting power of the UE upwards may include adjusting the transmitting power of the UE upwards based on a maximum powerRampingStep parameter.

The transmitting of the uplink signal to the network node based on the adjusted transmitting power may include transmitting the uplink signal to the network node based on a minimum ra-ResponseWindow parameter, according to the adjusted transmitting power.

The number of times the uplink signal is transmitted to the network node is not greater than a maximum preamble-TransMax parameter.

After the adjusting of the transmitting power of the UE upwards, the transmitting of the uplink signal to the network node based on the adjusted transmitting power may include: adjusting the transmitting power upwards in the current beam and transmitting the uplink signal in the current beam based on the adjusted transmitting power.

The method may include: when the UE determines that the configured maximum transmitting power is reached, adjusting the transmitting beam of the uplink signal if no acknowledgement response message for the uplink signal is received from the network node.

The method may include: the UE is pre-configured to activate a test mode in the non-connected state; or receiving an indication information for activating the test mode of the UE from the network node, and activating the test mode based on the indication information, the test mode is set to enable the UE to transmit uplink signals using the maximum transmitting power and/or perform the beamlock related operation in the non-connected state.

In certain example embodiments, there may be provided a method performed by a network node in a communication system, where the method may include: transmitting a first message to a UE, wherein the first message may include beamlock related information that can be applied to a non-connected state, when the UE is in a connected state; performing a corresponding measurement operation on the UE in the non-connected state, wherein the UE performs a corresponding beamlock related operation based on the beamlock related information in the non-connected state The method may include: receiving an uplink signal transmitted by the UE in the non-connected state; determining whether the UE is in the maximum transmitting power state based on the received uplink signal.

The determining of whether the UE is in the maximum transmitting power state may include: determining that the UE is in the maximum transmitting power state after receiving a predefined number of uplink signals; or measuring the received uplink signal transmitted by the UE and determining that the UE is in the maximum transmitting power state in a case that a difference between transmitting powers obtained from two adjacent measurements reaches a predefined threshold.

After receiving the uplink signal transmitted by the UE, the method further may include: transmitting a reference signal with same index information; the determining of whether the UE is in the maximum transmitting power state based on the received uplink signal may include at least one of: measuring the received uplink signal transmitted by the UE, and reducing a power of a next reference signal transmitted by the network node; determining that the UE is in the maximum transmitting power state after receiving a predefined number of uplink signals or in a case that a difference between transmitting powers obtained from two adjacent measurements reaches a predefined threshold.

The determining of whether the UE is in the maximum transmitting power state based on the received uplink signal may include: an acknowledgement response message for the uplink signal is not fed back to the UE before the UE is determined to be in the maximum transmitting power state, and feeding back the acknowledgement response message after completing a corresponding test when the UE is in the maximum transmitting power state and/or the beamlock state.

The method may include: transmitting an indication information for activating a UE test mode to the UE, wherein the test mode is set to enable the UE to transmit uplink signals using the maximum transmitting power and/or perform the beamlock related operation in the non-connected state.

The method may include: sending to the UE at least one of: a maximum preambleReceivedTargetPower parameter, a maximum powerRampingStep parameter, a minimum ra-Response Window parameter, a maximum preambleTrans-Max parameter, wherein the maximum preambleReceived-TargetPower parameter is used to instruct the UE to transmit an uplink signal to the network node in accordance with a transmitting power corresponding to the maximum preambleReceivedTargetPower parameter; and/or the maximum powerRampingStep parameter is used to instruct the UE to adjust the transmitting power of the UE upwards based on the maximum powerRampingStep parameter; and/or the minimum ra-ResponseWindow parameter is used to instruct the UE to transmit an uplink signal to the network node based on the minimum ra-Response Window parameter, according to the adjusted transmitting power; and/or the maximum preambleTransMax parameter is used to indicate that the number of times the uplink signal is transmitted to the network node is not greater than the maximum preambleTransMax parameter.

The method may include: determining a beam peak direction and/or a spherical coverage threshold direction of the UE in the connected state; the receiving of the uplink signal transmitted by the UE may include: receiving the uplink signal transmitted by the UE while the UE is in an idle or inactive state based on the determined beam peak direction and/or spherical coverage threshold direction.

The method may include: determining polarization directions corresponding to the beam peak direction and/or polarization directions corresponding to the spherical coverage threshold direction of the UE in the connected state; the receiving of the uplink signal transmitted by the UE may include: receiving the uplink signal transmitted by the user equipment while the UE is in the idle state or inactive state based on a polarization direction with the maximum transmitting power among the two polarization directions corresponding to the beam peak direction and/or a polarization direction with the maximum transmitting power among the two polarization directions corresponding to the spherical coverage threshold direction.

In a case that there are multiple beam peak directions, transmitting powers obtained by measuring uplink signals received in the multiple beam peak directions may be interpolated to obtain the transmitting power of the UE; and/or in a case that there are multiple spherical coverage threshold directions, transmitting powers obtained by measuring uplink signals received in the multiple spherical coverage threshold directions may be interpolated to obtain the transmitting power of the UE.

The determining of whether the UE is in the maximum transmitting power state based on the received uplink signal may include: obtaining a component power and a polarization compensation power based on the uplink signal transmitted by the UE when the UE is in first polarization, wherein the first polarization may be polarization with a larger power among theta polarization and phi polarization; determining a sum of the component power and the polarization compensation power of the first polarization as the transmitting power of the UE; and determining that the UE is in the maximum transmitting power state in a case where a difference between transmitting powers obtained from two adjacent measurements reaches a predefined threshold.

The obtaining of the component power based on the uplink signal transmitted by the UE may include: while the UE is in the idle or inactive state, measuring the uplink signal transmitted by the UE to obtain the component power corresponding to the first polarization; the obtaining of the polarization compensation power based on the uplink signal transmitted by the UE may include: determining a total power and the component power of the first polarization measured when the UE is in the first polarization in the connected state, and using a difference between the total power and the component power of the first polarization as the polarization compensation power.

In certain example embodiments, there is provided a method performed by a network node in a communication system, where the method may include: receiving an uplink signal transmitted by the UE in the non-connected state; determining whether the UE is in the maximum transmitting power state based on the received uplink signal.

The determining of whether the UE is in the maximum transmitting power state may include: determining that the UE is in the maximum transmitting power state after receiving a predefined number of uplink signals; or measuring the received uplink signal transmitted by the UE and determining that the UE is in the maximum transmitting power state in a case that a difference between transmitting powers obtained from two adjacent measurements reaches a predefined threshold.

After receiving the uplink signal transmitted by the UE, the method further may include: transmitting a reference signal with same index information; the determining of whether the UE is in the maximum transmitting power state based on the received uplink signal may include at least one of: measuring the received uplink signal transmitted by the UE, and reducing a power of a next reference signal transmitted by the network node; determining that the UE is in the maximum transmitting power state after receiving a predefined number of uplink signals or in a case that a difference between transmitting powers obtained from two adjacent measurements reaches a predefined threshold.

The determining of whether the UE is in the maximum transmitting power state based on the received uplink signal may include: an acknowledgement response message for the uplink signal is not fed back to the UE before the UE is determined to be in the maximum transmitting power state, and feeding back the acknowledgement response message after completing a corresponding test when the UE is in the maximum transmitting power state and/or the beamlock state.

The method may include: transmitting an indication information for activating a test mode of the UE to the UE, wherein the test mode is set to enable the UE to transmit uplink signals using the maximum transmitting power and/or perform the beamlock related operation in the non-connected state.

The method may include: transmitting to the UE at least one of: a maximum preambleReceivedTargetPower parameter, a maximum powerRampingStep parameter, a minimum ra-Response Window parameter, a maximum preambleTransMax parameter, wherein the maximum preambleReceivedTargetPower parameter is used to instruct the UE to transmit an uplink signal to the network node in accordance with a transmitting power corresponding to the maximum preambleReceivedTargetPower parameter; and/or the maximum powerRampingStep parameter is used to instruct the UE to adjust the transmitting power of the UE upwards (power ramping) based on the maximum powerRampingStep parameter; and/or the minimum ra-Response Window parameter is used to instruct the UE to transmit an uplink signal to the network node based on the minimum ra-ResponseWindow parameter, according to the adjusted transmitting power; and/or the maximum preambleTransMax parameter is used to indicate that the number of times the uplink signal is transmitted to the network node is not greater than the maximum preambleTransMax parameter.

In certain example embodiments, there is provided a method performed by a network node in a communication system, where the method may include: obtaining respective first effective isotropic radiated powers (EIRPs) of a user equipment (UE) at respective test positions and in respective antenna transmitting modes; determining, based on the respective first EIRPs, a second EIRP corresponding to each test position; determining a total radiated power (TRP) based on the second EIRP corresponding to each test position.

The obtaining of the respective first EIRPs of the UE at the respective test positions and in the respective antenna transmitting modes may include: transmitting at least two antenna transmitting mode information to the UE when the UE is in any one of the test positions; receiving, from the UE, a signal transmitted by the UE in that test position based on each of the at least two antenna transmitting mode information, testing the corresponding first EIRP of the UE in each transmitting mode.

The obtaining of the first EIRPs of the UE at the respective test positions and in the respective antenna transmitting modes may include: transmitting, to the UE, respective antenna transmitting mode information in sequence; for each antenna transmitting mode information, receiving, from the UE, signals transmitted by the UE in the respective test positions based on the antenna transmitting mode information, testing the first EIRPs of the UE in the respective test positions and in the antenna transmitting mode.

The determining of the second EIRP corresponding to each test position based on the respective first EIRPs may include: determining a maximum value of all first EIRPs corresponding to the test position as the second EIRP corresponding to the test position.

The determining of the total radiated power (TRP) based on the second EIRP corresponding to each test position may include: performing spherical integration on all second EIRPs corresponding to respective test positions to obtain the TRP.

The at least two antenna transmitting modes may include at least one of: transmitting with each antenna in a transmit antenna switching (TAS) supported by the UE; transmitting using a beam selected by beam refinement; transmitting in a transmit diversity (TxD) mode supported by the UE; and transmitting with each of all or some of transmit precoding matrix indexes configured for the UE.

The network node may include a System Simulator (SS).

In certain example embodiments, there is provided a method performed by a user equipment (UE), where the method may include: obtaining at least two antenna transmitting mode information in sequence; transmitting signals in accordance with the at least two antenna transmitting modes at respective test positions, respectively.

In certain example embodiments, there may be provided a method performed by a user equipment (UE), where the method may include: obtaining at least two antenna transmitting mode information; transmitting signals with the at least two antenna transmitting modes respectively at respective test positions.

In certain example embodiments, there is provided a communication method performed by a network node, where the method may include: determining anchor directions of multiple angle of arrivals for a user equipment, wherein each angle of arrival corresponds to a reference signal; obtaining, based on the anchor directions, a spherical coverage formed by each reference signal relative to the user equipment.

The obtaining of the spherical coverage formed by each reference signal relative to the user equipment based on the anchor directions may include: rotating the user equipment to obtain the spherical coverage formed by each reference signal relative to the user equipment.

The multiple angle of arrivals may have the same anchor direction; the obtaining of the spherical coverage formed by each reference signal relative to the user equipment based on the anchor directions may include: for an angle of arrival to be measured, fixing other angle of arrivals other than the angle of arrival to be measured among the multiple angle of arrivals as the anchor direction, and scanning and testing the angle of arrival to be measured on a three-dimensional sphere per direction to obtain the spherical coverage.

Each angle of arrival may have different anchor directions; the obtaining of the spherical coverage formed by each reference signal relative to the user equipment based on the anchor directions may include: for an angle of arrival to be measured, fixing other angle of arrivals other than the angle of arrival to be measured among the multiple angle of arrivals as anchor directions corresponding to the other angle of arrivals, and scanning and testing the angle of arrival to be measured on a three-dimensional sphere per direction to obtain the spherical coverage.

The anchor direction may include a primary anchor direction and at least one secondary anchor direction, and an angle between the primary anchor direction and the secondary anchor direction may be greater than an angle threshold, the obtaining of the spherical coverage formed by each reference signal relative to the user equipment based on the anchor directions may include: for an angle of arrival to be measured, fixing other angle of arrivals other than the angle of arrival to be measured among the multiple angle of arrivals as the primary anchor direction; in a case that a spatial angle between the primary anchor direction and the angle of arrival to be measured being scanned and tested is less than the angle threshold, switching the other angle of arrivals from the primary anchor direction to the secondary anchor direction and continuing to scan and test the angle of arrival to be measured on the three-dimensional sphere.

The method further may include: obtaining, from the user equipment, the angle threshold and/or angles between different angle of arrivals, wherein the angle threshold is different for different angle of arrivals.

The anchor direction is a beam peak direction and/or a predefined direction.

A spatial relationship between a traffic channel of each of the multiple angle of arrivals and a downlink reference signal is configured as Quasi Co-Located (QCL) type D; and/or traffic channels of different angle of arrivals among the multiple angle of arrivals are configured for data transmission with different layer data streams.

The angle threshold is pre-configured, or pre-defined, or transmitted by the user equipment through signaling.

The method further may include: receiving, from the user equipment, angle information measured by the user equipment through radio resource management measurement.

The anchor is a base station antenna probe in a testing system, and the anchor direction is an angle of arrival (AoA) configured with a reference signal.

In certain example embodiments, there is provided a user equipment, which may include a transceiver; and a processor coupled, directly or indirectly, to the transceiver and configured to perform the above communication method performed by the user equipment.

In certain example embodiments, there is provided a network node, which may include a transceiver; and a processor, coupled, directly or indirectly, to the transceiver and configured to perform the above communication method performed by the network node.

In certain example embodiments, there is provided an electronic device, which may include: at least one processor; and at least one memory storing computer-executable instructions, wherein the computer-executable instructions, when run by the at least one processor, cause the at least one processor to perform any one of the methods as described above.

In certain example embodiments, there is provided a computer-readable storage medium storing instructions, wherein the instructions, when run by at least one processor, may cause the at least one processor to perform the communication methods as described above.

By obtaining the first message (e.g., including the beam-lock related information that can be applied in the non-connected state) when the UE is in the connected state and performing the corresponding beamlock related operation based on the beamlock related information when the UE is in the non-connected state, it may meet the requirements and tests of the transmitting power and/or the beam correspondence in the non-connected state, in order to better meet communication needs.

The beneficial effects brought by the technical solutions provided will be described later in connection with specific optional embodiments, or may be known from the description of the embodiments, or may be learned from the implementation of the embodiments.

BRIEF DESCRIPTION OF THE DRAWINGS

In order to more clearly and easily illustrate and understand the technical solutions in the example embodiments of the present disclosure, the following is a brief description of the accompanying drawings that need to be used in the description of the embodiments of the present disclosure.

FIG. 9 illustrates a schematic diagram of determining a maximum transmitting power provided by an example embodiment;

FIG. 15 illustrates a flowchart of a communication method performed by a user equipment in a communication system provided in an example embodiment;

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which may be used in various embodiments of the present disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have concept or excessively formal meanings unless clearly defined in the present disclosure.

Figure 1:
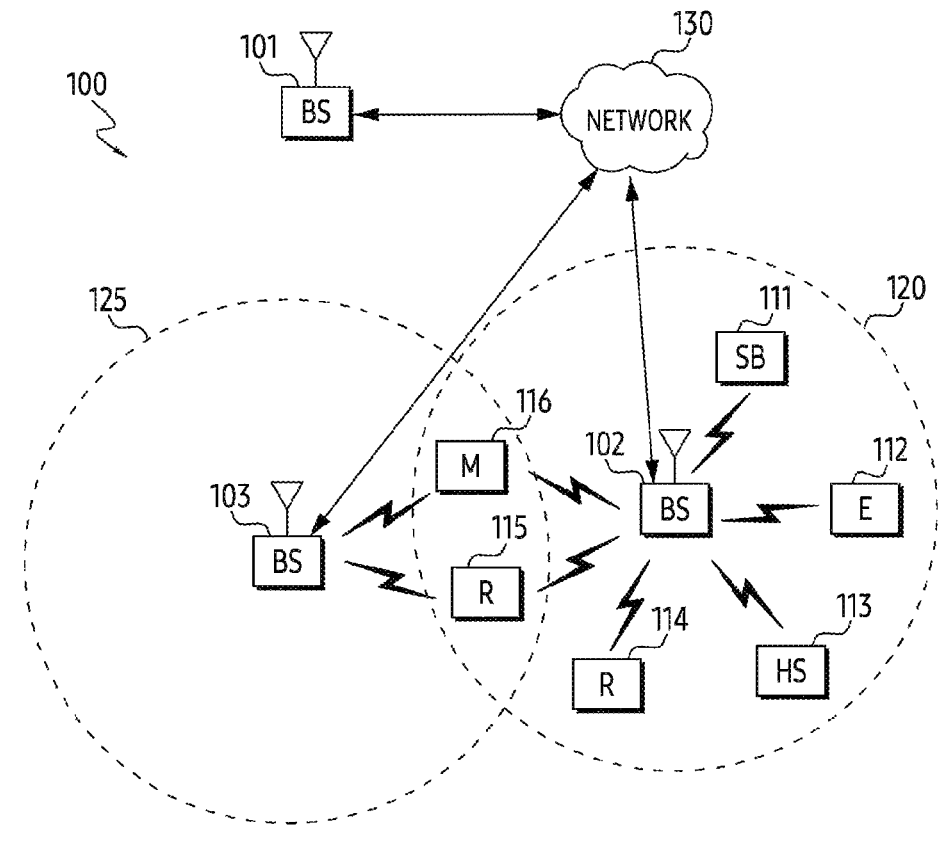
FIG. 1 illustrates an example system architecture for system architecture evolution.

FIG. 1 illustrates an example wireless network 100 according to various embodiments of the present disclosure. The embodiment of the wireless network 100 shown in FIG. 1 is for illustration only. Other embodiments of the wireless network 100 may be used without departing from the scope of the present disclosure.

The wireless network 100 may include a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" may be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" may be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. gNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in example embodiments. In some embodiments, one or more of gNB 101, gNB 102, and gNB 103 support codebook designs and structures for systems with 2D antenna arrays.

Although FIG. 1 illustrates an example of the wireless network 100, various changes may be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
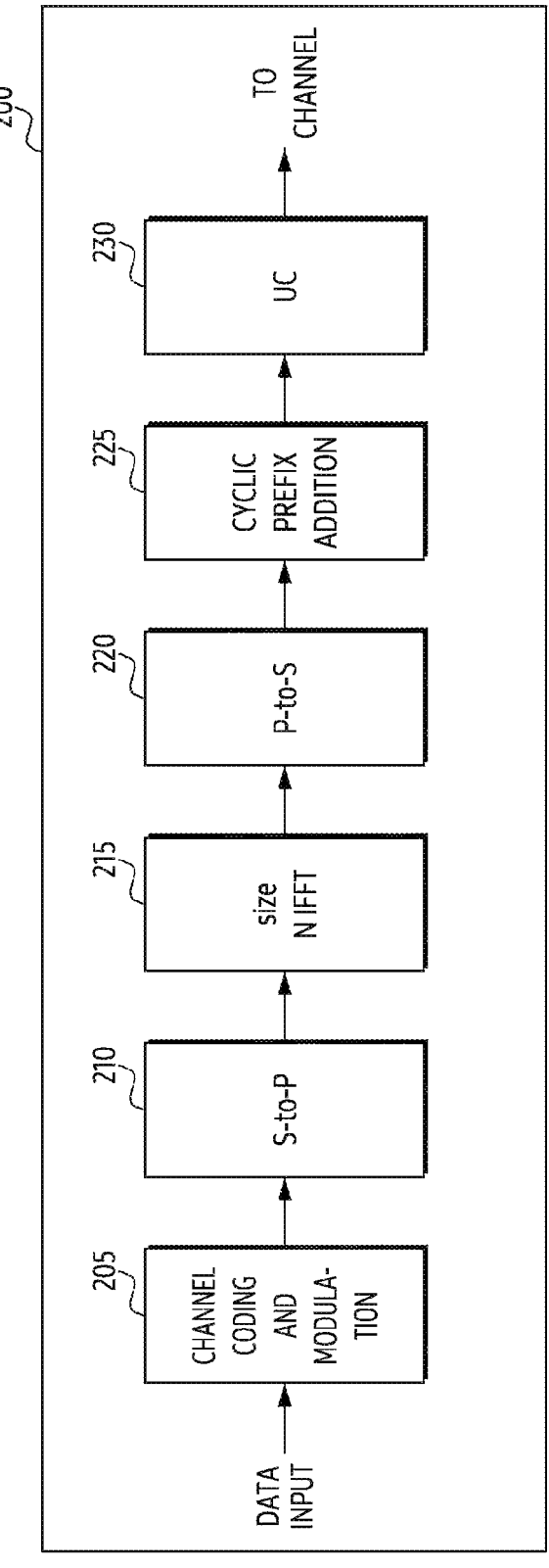
FIG. 2A and FIG. 2B illustrate an example wireless transmission path and an example wireless reception path according to some embodiments.
Figure 2B:
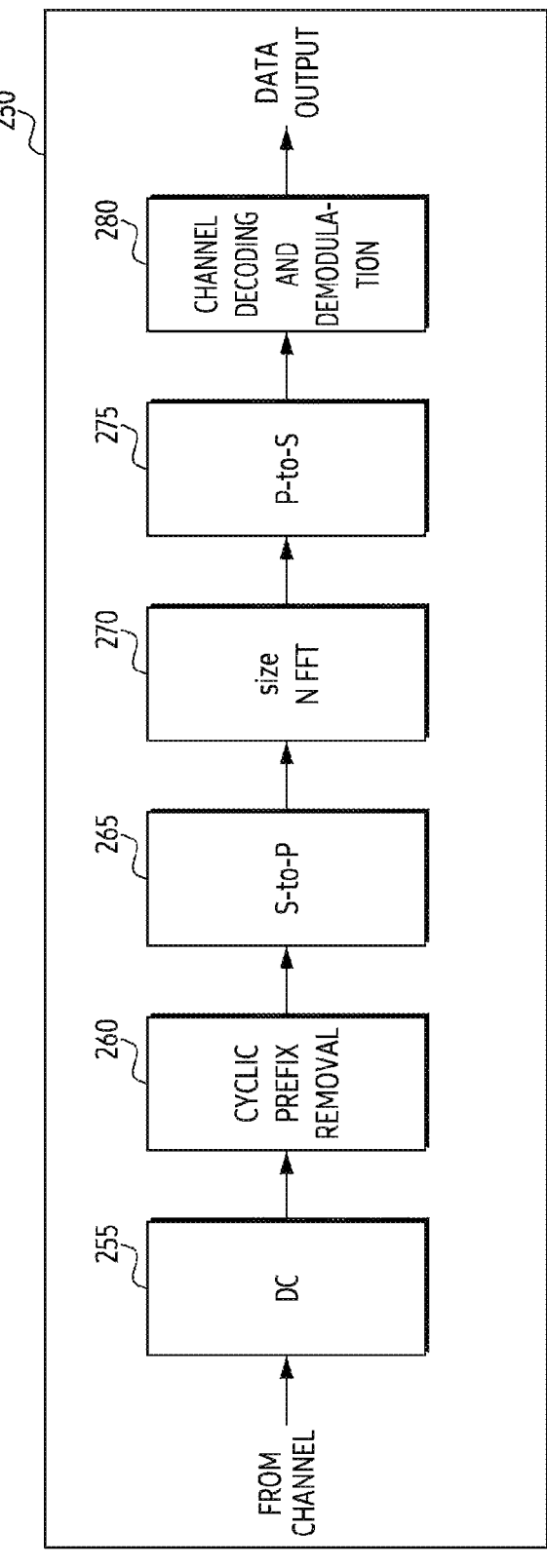

FIGS. 2a and 2b illustrate example wireless transmission and reception paths. In the following description, the transmission path 200 may be described as being implemented in a gNB, such as gNB 102, and the reception path 250 may be described as being implemented in a UE, such as UE 116. However, it should be understood that the reception path 250 may be implemented in a gNB and the transmission path 200 may be implemented in a UE. In some embodiments, the reception path 250 is configured to support codebook designs and structures for systems with 2D antenna arrays as described in example embodiments.

The transmission path 200 may include a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 may include a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2a and 2b may be implemented using only hardware, or using a combination of hardware and software/firmware. As a specific example, at least some of the components in FIGS. 2a and 2b may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms may be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2a and 2b illustrate examples of wireless transmission and reception paths, various changes may be made to FIGS. 2a and 2b. For example, various components in FIGS. 2a and 2b may be combined, further subdivided or omitted, and additional components may be added according to specific requirements. Furthermore, FIGS. 2a and 2b are intended to illustrate examples of types of transmission and reception paths that may be used in a wireless network. Any other suitable architecture may be used to support wireless communication in a wireless network.

Figure 3A:
FIG. 3A illustrates an example user equipment according to various embodiments.

FIG. 3a illustrates an example UE 116. The embodiment of UE 116 shown in FIG. 3a is for illustration only, and UEs 111-115 of FIG. 1 can have the same or similar configuration. However, a UE has various configurations, and FIG. 3a does not limit the scope of the present disclosure to any specific implementation of the UE.

UE 116 may include an antenna 305, a radio frequency (RF) transceiver 310, a transmission (TX) processing circuit 315, a microphone 320, and a reception (RX) processing circuit 325. UE 116 also may include a speaker 330, a processor/controller 340, an input/output (I/O) interface 345, an input device(s) 350, a display 355, and a memory 360. The memory 360 may include an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 may include at least one microprocessor or microcontroller.

The processor/controller 340 is also capable of executing other processes and programs residing in the memory 360, such as operations for channel quality measurement and reporting for systems with 2D antenna arrays as described in example embodiments. The processor/controller 340 can move data into or out of the memory 360 as required by an execution process. In some embodiments, the processor/ controller 340 is configured to execute the application 362 based on the OS 361 or in response to signals received from the gNB or the operator. The processor/controller 340 is also coupled, directly or indirectly, to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled, directly or indirectly, to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled/connected (directly or indirectly) to the processor/controller 340. A part of the memory 360 can include a random access memory (RAM), while another part of the memory 360 can include a flash memory or other read-only memory (ROM).

Although FIG. 3a illustrates an example of UE 116, various changes may be made to FIG. 3a. For example, various components in FIG. 3a may be combined, further subdivided or omitted, and additional components may be added according to specific requirements. As a specific example, the processor/controller 340 may be divided into a plurality of processors, such as one or more central processing units (CPUs) and one or more graphics processing units (GPUs). Furthermore, although FIG. 3a illustrates that the UE 116 is configured as a mobile phone or a smart phone, UEs may be configured to operate as other types of mobile or fixed devices.

Figure 3B:
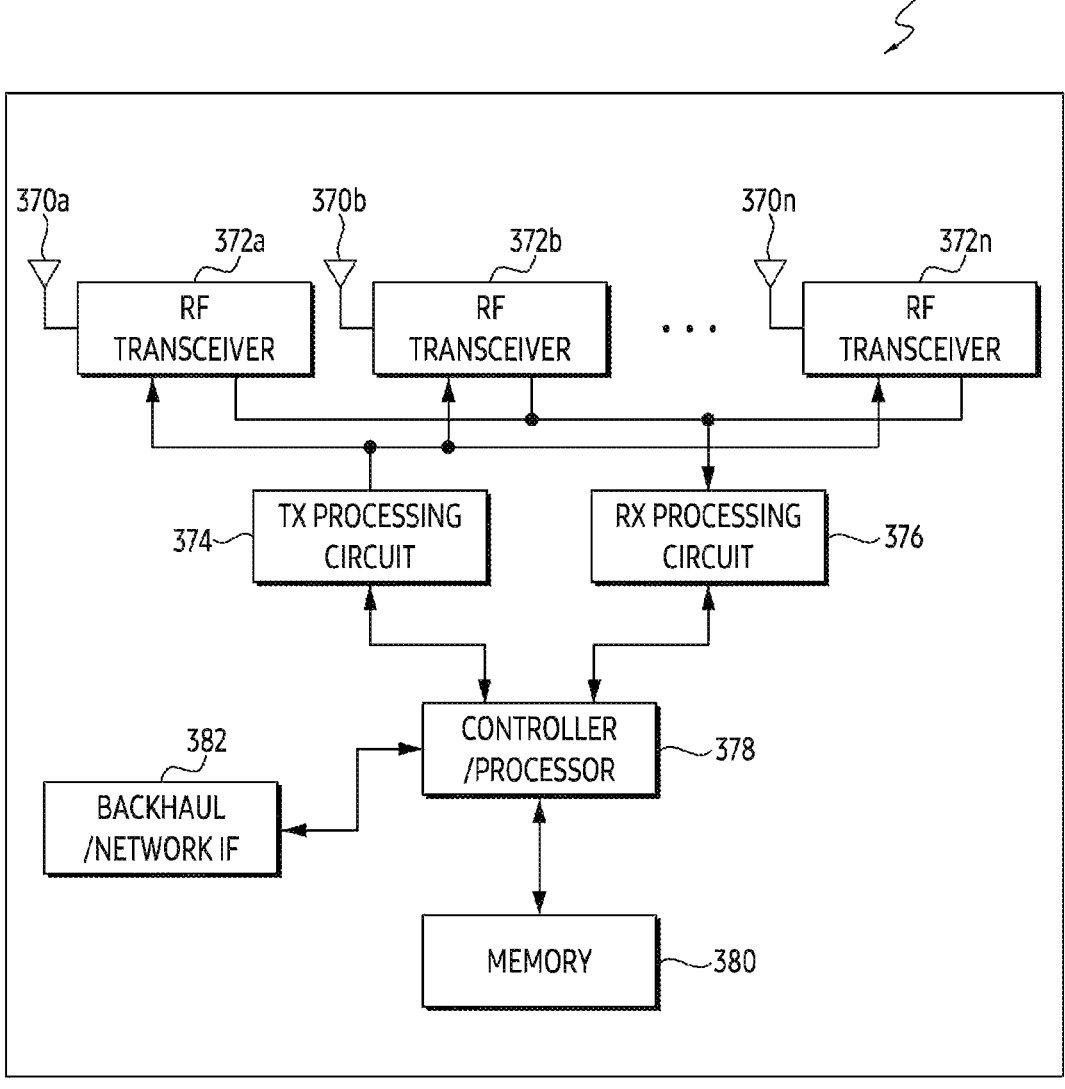
FIG. 3B illustrates an example network node according to various embodiments.

FIG. 3b illustrates an example gNB 102. The embodiment of gNB 102 shown in FIG. 3b is for illustration only, and other gNBs of FIG. 1 can have the same or similar configuration. However, a gNB has various configurations, and FIG. 3b does not limit the scope of the present disclosure to any specific implementation of a gNB. It should be noted that gNB 101 and gNB 103 can include the same or similar structures as gNB 102.

As shown in FIG. 3b, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 may include at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in example embodiments. In some embodiments, the controller/processor 378 supports communication between entities such as web RTCs. The controller/processor 378 can move data into or out of the memory 380 as required by an execution process.

The controller/processor 378 is also coupled, directly or indirectly, to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 may include any suitable structure that supports communication through a wired or wireless connection, such as an Ethernet or an RF transceiver.

The memory 380 is coupled, directly or indirectly, to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3b illustrates an example of gNB 102, various changes may be made to FIG. 3b. For example, gNB 102 can include any number of each component shown in FIG. 3a. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

The exemplary embodiments of the present disclosure are further described below in conjunction with the accompanying drawings.

The text and drawings are provided as examples only to help readers understand the present disclosure. They are not intended and should not be interpreted as limiting the scope of the present disclosure in any way. Although certain embodiments and examples have been provided, based on the content disclosed herein, modifications to the illustrated embodiments and examples may be made without departing from the scope.

It is understood that the solutions provided by the embodiments of the present disclosure may be applicable to, but not limited to, the wireless network described above.

The network node in the example embodiments may include, but are not limited to, a base station, a repeater, an integrated access and backhaul device, a hotspot, a self-assembling node, a test instrument with a system simulation capability, a System Simulator (SS) (e.g., a simulated base station) or a core network node, a user equipment, etc.

The 5G New Radio (NR) may include two frequency ranges, namely a Frequency Range 1 (FR1) and a Frequency Range 2 (FR2). For the FR2 of the NR, a millimeter wave communication system compensates for link loss in a high frequency band by using a beamforming technology. In order to achieve good millimeter wave communication performance, a FR2 millimeter wave terminal needs to support beam correspondence. According to the reciprocity between uplink and downlink of antenna and radio channel, directions of an uplink beam and a downlink beam of a radio communication link are the same, and directions of a receiving beam and a transmitting beam of a device are the same, and this characteristic is called the beam correspondence. There is a need for enhancements to the requirements design and/or the test method for the beam correspondence to better meet communication requirements.

In the example embodiments, on the one hand, the requirements and tests for the beam correspondence and the transmitting power are indicated only in the connected state of radio resource control (RRC_connected), while the requirements and tests for the beam correspondence and the transmitting power in the non-connected state of radio resource control, such as the idle state (RRC_Idle) or the inactive state (RRC_Inactive), are still absent. For example, the initial access in the idle state and the Small Data Transmission (SDT) in the inactive state do not involve the requirements and tests of the beam correspondence.

In the connected state, the power control of the user equipment/terminal is closed-loop power control, and the network device may adjust the power of the user equipment to the maximum through the power control command, and then perform power measurement to verify whether the terminal meets the beam correspondence in the connected state. While in the idle state and inactive states, the power control of the terminal is open-loop power control, and the transmitting power of the terminal cannot be precisely controlled. Depending on different network environments, the transmitting power of the terminal may be changed accordingly, or even if the network environment remains unchanged, when the spatial location or orientation of the terminal is changed, the transmitting power of the terminal may be changed due to the variation of the directionality of the terminal antenna and the antenna gain. Therefore, the beam correspondence in the connected state is not representative of the beam correspondence in the idle and inactive states.

Figure 4A:
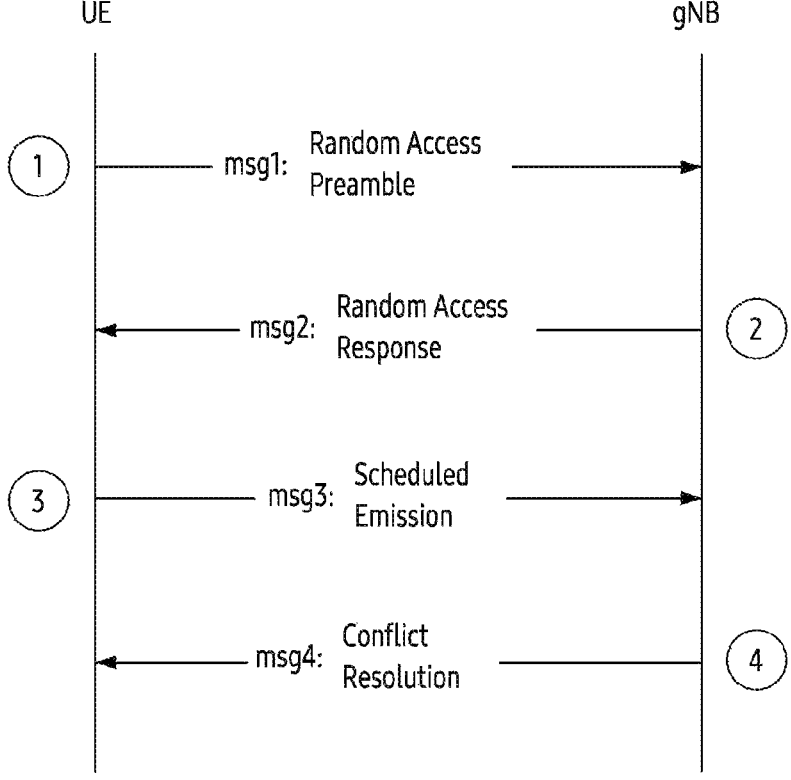
FIG. 4A illustrates a schematic diagram of an example four-step random access process.
Figure 4B:
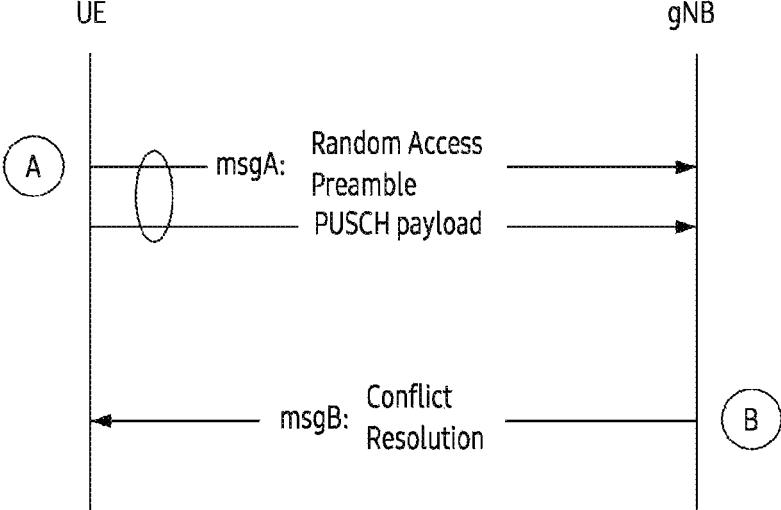
FIG. 4B illustrates a schematic diagram of an example two-step random access process.

The beam correspondence is established based on the requirement of the spherical coverage of the millimeter wave terminal, which generally requires the terminal to transmit at the maximum power steadily. In the idle and inactive states, the unpredictability of the transmitting power of the terminal makes it difficult to meet the requirements and tests need of the beam correspondence. Taking the random access in the idle state as an example, referring to FIG. 4a, the transmitting powers of the msg1 and the msg3 in the four-step random access process are open-loop power control, and their transmitting power cannot be precisely configured. Referring to FIG. 4b, the transmitting power of the msgA in the two-step random access process is open-loop power control, and its transmitting power cannot be precisely configured.

In addition, the requirements and tests of the transmitting power of the terminal and the beam correspondence in the connected state require the terminal to be configured with the UE Beamlock Function (UBF) or the UE Beamlock test function (UBF) on (activated). However, when the terminal performs power test of uplink signal transmission (e.g. Physical Random Access Channel (PRACH) transmission) and beam correspondence test in non-connected state (e.g. RRC_Idle, RRC_inactive), the current beamlock function cannot be used in non-connected state because it only supports the connected state. In this document, the terms "beamlock", "RF lock function", "RF lock", "RF state lock", and "lock" and "beam state lock" used herein are used interchangeably, which mean to lock the direction and/or power etc. of the transmitting/receiving beam of the UE signal.

Figure 5:
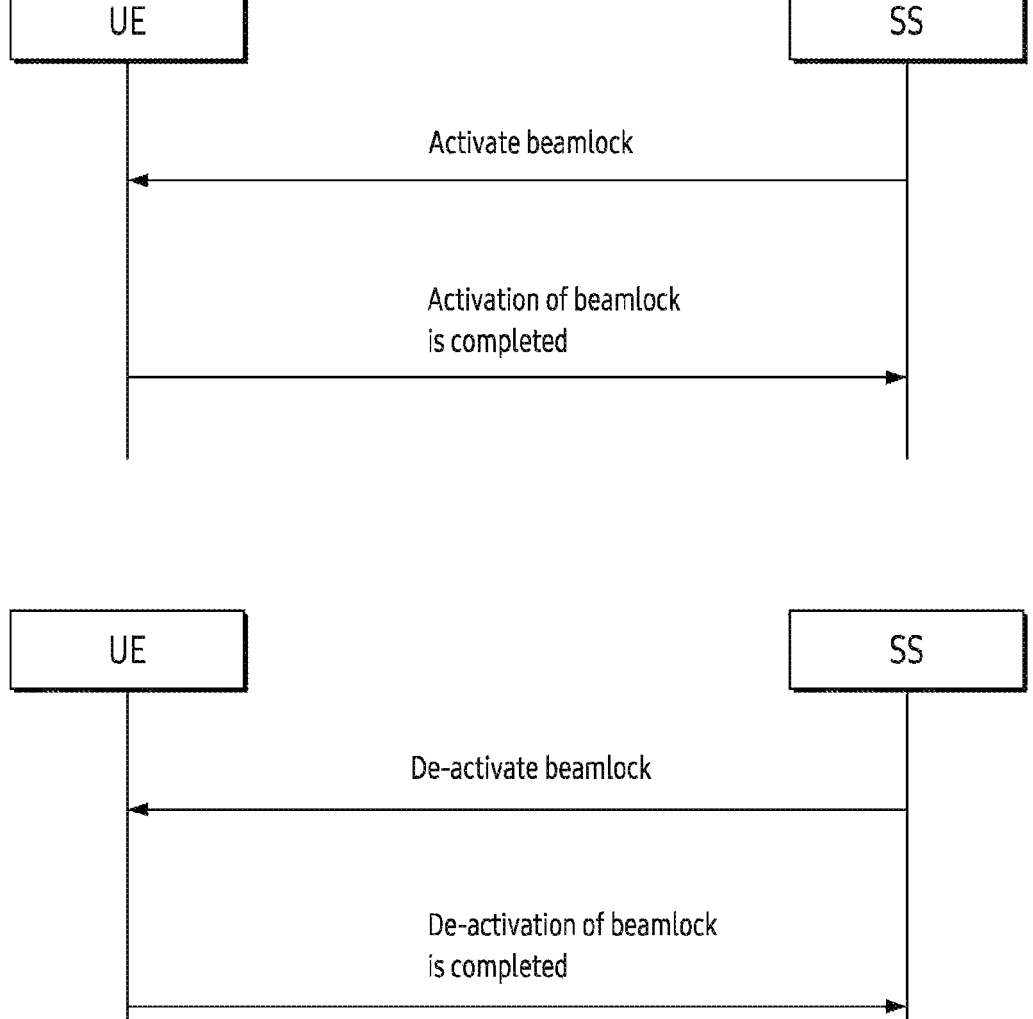
FIG. 5 illustrates an activation and de-activation process of an example beamlock function of a UE in a connected state.

The current beamlock function needs to be activated and de-activated in the connected state (RRC_connected) and is only effective in the connected state. FIG. 5 illustrates an activation and de-activation process of the beamlock function of the UE in the connected state.

In the upper diagram of FIG. 5, the System Simulator (SS) may be a simulated base station or a test instrument. The System Simulator transmits a message for activating the beamlock to the UE, and the UE transmits an activation beamlock completion message to the SS after completing the activation of the beamlock based on the message for activating the beamlock. In the lower diagram of FIG. 5, the SS transmits a message for de-activating the beamlock to the UE when the de-activation of the beamlock is required, and the UE transmits a de-activation beamlock completion message to the SS after de-activating the beamlock based on the message for de-activating the beamlock. The requirement definition and test for the transmitting power of uplink signals (e.g. PRACH) in the non-connected state in the relevant technology require the terminal to be in the beam-locked state. However, the current beamlock function cannot be used in the non-connected state, as mentioned above.

On the other hand, initial FR2 mmWave terminals generally support reception and transmission in a single Angle of Arrival (1AoA) only, while some terminals can also support simultaneousReceptionDiffTypeD-r16, then such terminals can support reception in Multiple Angle of Arrivals (multi-AoA) (e.g., dual angle of arrivals or more angle of arrivals). With the enhancement of millimeter-wave terminal functions, it can also support transmission in Multi-AoA.

The requirement design and test methods for reception and/or transmission in multi-AoA are still absent.

Figure 6A:
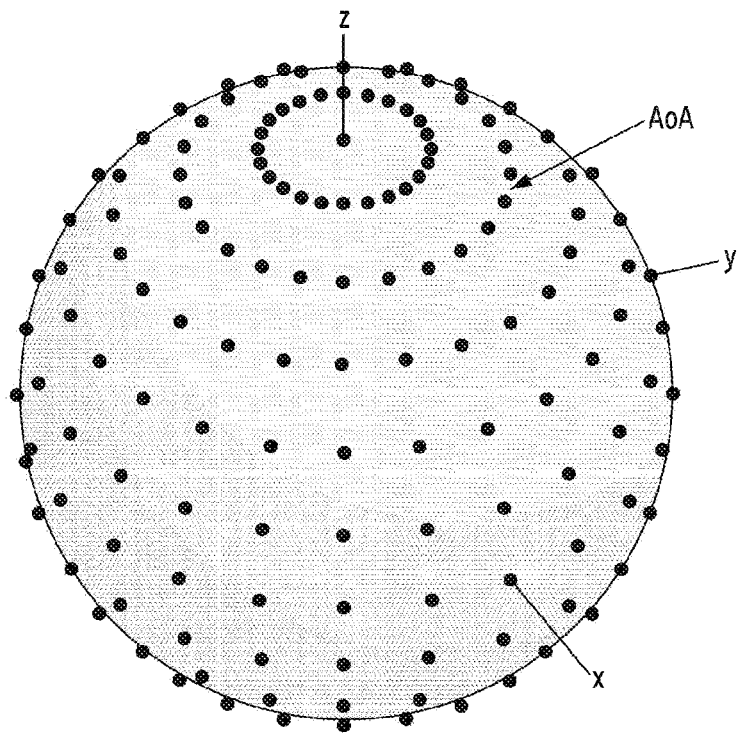
FIG. 6A illustrates a schematic diagram of an example three-dimensional space schematic of a single angle of arrival.
Figure 6B:
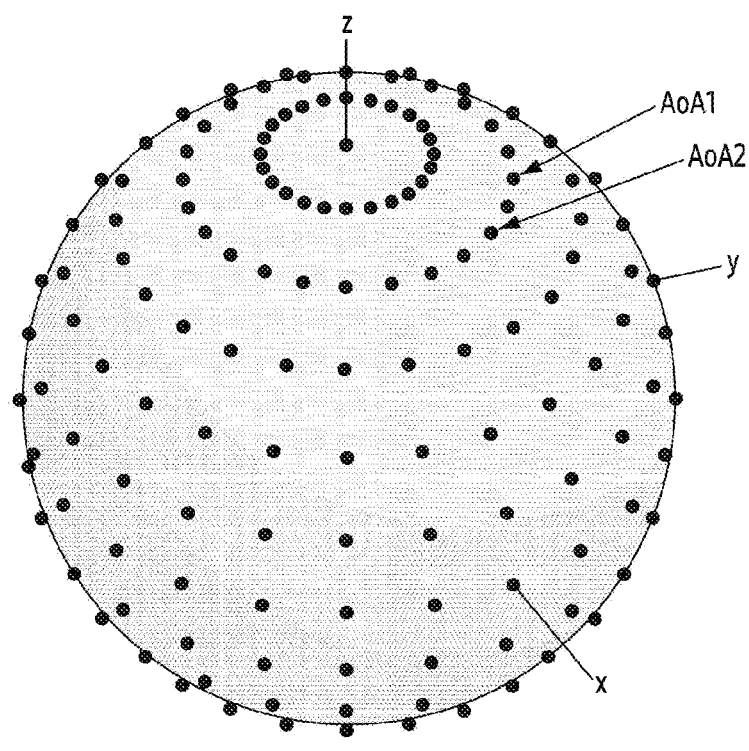
FIG. 6B illustrates a schematic diagram of an example three-dimensional space of multiple direction of arrivals.

The performance of terminals supporting reception and/or transmission in the multiple angle of arrivals cannot be reflected based on the single angle of arrival. For multiple angle of arrivals, the single angle of arrival technique cannot be simply replicated. FIG. 6a illustrates a schematic diagram of a three-dimensional space of a single Angle of Arrival (AoA). FIG. 6b illustrates a schematic diagram of a three-dimensional space of multiple angle of arrivals by taking two Angle of Arrivals (AoA1 and AoA2) as an example. In order to design the requirements and tests (such as spherical coverage) of the terminal for multiple angle of arrivals, it is necessary to solve the problem of combining multiple angle of arrivals, spatial interference avoidance, etc., in addition to configuring downlink signals from multiple directions.

Furthermore, whether FR1 or FR2, 5G NR or other communication standards, there are more and more multi-antenna (including dual-antenna) terminals. However, the current requirement definition and test of the Total Radiated Power (TRP) is still based on single antenna. For example, when the terminal supports Transmit Antenna Switch (TAS), the TRP is only indicated as the TRP result of a single antenna with better performance, and this requirement definition and test method do not characterize the performance gains brought by other antennas. When the multi-antenna terminal can flexibly configure its transmitting state, such as dynamic antenna switch, amplitudes and phases of multi-antenna simultaneous transmission are controlled to achieve beamforming or spatial diversity, and the traditional requirement definition and test of the total radiated power cannot reflect the actual radiated power performance of the terminal.

For example, when the terminal supports Transmit Antenna Switch (TAS), the Total Radiated Power (TRP) is only indicated as the TRP result of a single antenna with better performance, and this requirement definition and test method do not characterize the performance gains brought by other antennas, as follows:

```
Suppose there are 2 antennas used for transmit antenna switch
Measure TRP with the first antenna transmitting (TRP1)
Measure TRP with the second antenna transmit (TRP2)
Final TRP = max (TRP1, TRP2)
```

The above mentioned problems of 5G millimeter wave communication are still absent, and the purpose of the present disclosure is to provide methods to solve the above existing problems, so as to achieve the requirements and tests of the uplink signal power and the beam correspondence in the non-connected state (such as idle state and inactive state), and to propose the requirement design and test of the terminal performance based on multiple angle of arrivals and the requirement design and test method of a new total radiated power.

Figure 7:
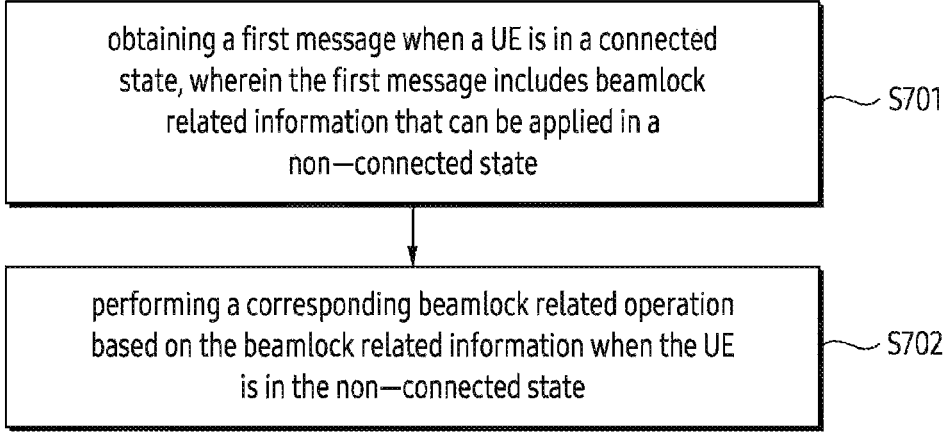
FIG. 7 illustrates a flowchart of an example communication method performed by a user equipment in a communication system provided by an example embodiment.

The beam correspondence is mainly characterized by spherical coverage, and the beam correspondence depends on the total distribution of the transmitting power of the user equipment when performing uplink transmission in respective directions in three-dimensional space. In order to solve the problem of the transmitting power variation of the terminal in the idle state and in the inactive state, FIG. 7 illustrates a flowchart of a communication method performed by a user equipment in a communication system provided by an embodiment of the present disclosure.

At step S701, the UE obtains a first message in a connected state, the first message may include beamlock related information that may be applied to a non-connected state. The user equipment may be a 5G millimeter wave terminal. The beamlock related information may include at least one of an indication message for maintaining, activating or de-activating the beamlock, duration information for maintaining or activating the beamlock, time delay information for activating or de-activating the beamlock, a message indicating in which state the UE maintains or activates the beamlock, information indicating a transmitting power of an uplink signal in the non-connected state, information of the uplink signal in the non-connected state, and a transmission running time of the uplink signal in the non-connected state.

The duration information may indicate a duration after the beamlock is activated.

The time delay information may indicate a time period from the moment when the UE receives the first message in the connected state to the moment when the beamlock is activated or de-activated, or a time period from the moment when the UE enters into the non-connected state to the moment when the beamlock is activated or de-activated.

The message indicating in which state the UE maintains or activates the beamlock may include at least one of a message indicating that the beamlock is maintained or activated in a case of entering into the non-connected state, and a message indicating that the beamlock is activated in a case of the UE receiving a particular command.

The message indicating that the beamlock is maintained or activated in the case of entering into the non-connected state may include at least one of a message indicating that the beamlock is maintained or activated in a case of entering into an inactive state, and a message indicating that the beamlock is maintained or activated in a case of entering into an idle state.

The information indicating the transmitting power of the uplink signal in the non-connected state may include at least one of a maximum transmitting power of the UE, a configured maximum transmitting power (Pcmax), an immediate transmitting power of the UE when the UE receives the first message, and an immediate transmitting power of the UE when the UE performs activating of the beamlock. Herein, the maximum transmitting power of the UE may refer to a maximum transmitting power that the UE can support. The configured maximum transmitting power (Pcmax) may refer to a maximum transmitting power configured by the network node. For example, when the UE enters into the non-connected state, it may transmit an uplink signal based on the Pcmax in the first message. In this case, the number of uplink signal transmissions may be reduced and the UE may transmit the uplink signal using the maximum transmitting power as soon as possible.

A beam for performing the beamlock related operation may include a beam the UE is using at the time of receiving the first message, or a beam the UE is using at the time of performing the beamlock related operation.

At step S702, the UE performs a corresponding beamlock related operation based on the beamlock related information when the UE is in the non-connected state. The beamlock related operation may include at least one of: an operation of activating the beamlock, an operation of de-activating the beamlock, and an operation of maintaining the beamlock. The operation of maintaining the beamlock may include performing the beamlock operation when the UE receives the first message, and maintaining the beamlock operation in the connected state when the UE is in the non-connected state.

The timing for performing the beamlock related operation may include at least one of: when the UE receives the first message, when the UE transmits an uplink signal for the first time in a next non-connected state, when the UE transmits a predefined number of uplink signals in the next non-connected state, when the UE detects that a transmitting power of the uplink signal reaches a configured maximum transmitting power, and when the UE reaches a predefined time delay or time delay information for activating the beamlock in the first message.

The timing when de-activating the beamlock operation may include at least one of: when the UE receives a beamlock de-activation message, when the UE re-enters into the connected state, when the UE receives an msg2 message or an msg4 message, when the UE reaches a predefined beamlock duration or duration information for maintaining or activating the beamlock in the first message; when the UE reaches a predefined time delay or time delay information for de-activating the beamlock in the first message.

The information about the timing for performing or de-activating the beamlock operation may be included in the first message or may be pre-set in the user equipment such that the user equipment may perform the corresponding beamlock related operation based on the information.

According to another embodiment of the present disclosure, the user equipment may activate the beamlock when transmitting an uplink signal for the first time or when transmitting uplink signals for a preset number of times in a next non-connected state, or de-activate the beamlock after entering into the connected state again.

The beamlock problems in the non-connected state, such as the uplink signal power measurement and the beam correspondence, may be solved in accordance with the method shown in FIG. 7.

The method shown in FIG. 7 may also include any one and/or any combination of the following:

After the terminal receives information for activating a RF lock function transmitted by the network node (or a system simulator, an instrument, etc.) in the connected state, the terminal immediately activates the RF lock function or delays (holds) the activating of the RF lock function, and when the terminal enters into the non-connected state, the terminal maintains or activates the RF lock function.

The information for activating the RF lock function transmitted by the network node may contain not only parameters such as the transmitting beam/receiving beam, but also parameters such as the time(s) to automatically trigger and/or de-activate the beamlock state, and may also include the message indicating in which state the UE maintains or activates or de-activates the beamlock state, and may also contain parameters such as the transmitting power of the uplink signal of the terminal in the next non-connected state, and/or the transmission running time of the uplink signal in the next non-connected state. In other words, the message may also include information indicating the lock effective state, or state information indicating that the beamlock "may still" be effective (compatible with the previous UBF functionality). The above "maintenance" may include performing the beamlock operation when the UE receives the first message and maintaining the beamlock operation in the connected state when the UE is in the non-connected state.

By including the transmitting power of the uplink signal of the terminal in the next non-connected state (e.g., RRC_idle, RRC_inactive), the problem that the requirements and tests for the beam correspondence in the non-connected state also require measuring the power of the uplink signal (e.g. msg1, msg3, msgA, etc.) is solved.

The activation of the RF lock function by the user equipment may be a trigger either in a time dimension or in an event dimension. The trigger in the time dimension may be an immediate activation of the RF lock function or a delayed activation of the RF lock function according to a preset time or a time carried in the message for activating the RF lock function. The trigger in the event dimension may be an activation of the RF lock function by the terminal device when the terminal device transmits an uplink signal (e.g. PRACH) in the next non-connected state, or an activation of the RF lock function by the user equipment when (after) it transmits a preset number of uplink signals in the next non-connected state, or may also be an activation of the RF lock function when the user equipment detects that the transmitting power of the uplink signal reaches the Pcmax, or may also be an activation of the RF lock function when the terminal device receives a specific signaling such as a signaling of releasing the connected state. The RF lock function may also be triggered by a combination of the time dimension and the event dimension. For example, the RF activation function is triggered when a specific event occurs after a specific delay of time. From the perspective of event triggering, the method further may include activating the beamlock when transmitting an uplink signal (e.g. PRACH) or when (after) transmitting a predefined number of uplink signals in the next non-connected state, or de-activating the beamlock after entering into the non-connected state again.

The de-activation of RF lock function by the user equipment may be triggered either in the time dimension or in the event dimension. The trigger in the time dimension may be an de-activation of the RF lock function according to a preset time or a time issued in the message for activating the RF lock function, while the trigger in the event dimension may be an (automatic) de-activation of the RF lock function after the terminal device enters into the connected state again, or when the terminal receives a downlink random access message (e.g. msg2, msg4, etc.) from the network node in the non-connected state, or after the terminal receives a de-activation message from the network node in the connected state. The RF lock function may also be triggered by a combination of the time dimension and the event dimension. For example, the de-activation of the RF lock function is triggered according to the event dimension within a specific time period, and the RF lock function is de-activated even without the trigger of the event dimension after the specific time period has elapsed.

After the user equipment receives the activation message from the network node, the response of the user equipment to the activation message from the network node may be divided into two steps, in which the first step is an immediate execution, e.g., a feedback of the ACK message may indicate that the user equipment has received it. However, at this time the user equipment does not immediately execute the RF state lock function, but stores the currently used beam and/or other locking parameters to be used in the second step. The second step is a delayed execution, and the RF state lock function is executed when the trigger condition of the time dimension and/or the trigger condition of the event dimension are/is satisfied. After the user equipment has performed the RF state lock function and enters into the connected state again, the user equipment sends a completion message or an end message (e.g., COMPLETE message, END message) to the network node, or de-activates the RF lock function according to other trigger mode(s) of the time dimension and/or the event dimension. In an example embodiment, in the case of delayed activation, the previously stored beam may be used. However, it should be noted that even in the case of delayed activation, the previously stored beam may not have to be used, and the serving beam at the time of locking may still be used during the delayed execution of the lock.

The following will be an example of the RF state lock function in the non-connected (idle and inactive) state.

As a first embodiment, after receiving activation of the RF state lock, the lock is activated immediately and remains valid in the non-connected state, before the de-activation message is received and is de-activated.

In this embodiment, the beamlock related information may include an indication message to maintain, activate or de-activate the beamlock.

This embodiment is similar to the conventional UBF, with the difference that it remains valid in the non-connected state. The effect of this embodiment is to achieve locking the beam and/or other locking parameters in the non-connected state.

As a second embodiment, after receiving activation of the RF state lock, the lock is activated immediately and remains valid in the non-connected state, before a specific time period has elapsed and is de-activated.

In this embodiment, the beamlock related information may include duration information for maintaining or activating the beamlock.

The first embodiment relies on receiving the de-activation message in the connected state in order to de-activate the lock. However, once the user equipment enters into the non-connected state, some channel states are changed such as location change, which may make it difficult or costly for the user equipment to enter into the connected state again, so the second embodiment introduces a time dimension mechanism to de-activate the lock state.

This embodiment sets the duration for which the user equipment maintains the RF state lock by a preset time or the time indicated by the information carried in the message for activating the RF state lock transmitted by the network node, and the lock state is automatically released after the timeout.

The preset time may be a standard time value.

The manner of indicating the time by the information carried in the activation message may be implemented by one or more bits of Table 1 below. When the number of bits is 3, a time value of up to eight time values may be indicated from a preset enumeration value.

In this case, the UE beamlock test function is shown as follows:

TABLE 1

| 8 | 7 | 6 | 5 | 4 | 3 | 2 | 1 | Bit number |
|---|---|---|---|---|---|---|---|---|
| | | | T1 | T2 | T3 | X1 | X2 | Octet 1 |

Where X1, X2=01 is used to activate beamlock for Tx only, X1, X2=10 is used to activate beamlock for Rx only and X1, X2=11 is used to activate beamlock for both Tx and Rx.

Note that X1, X2=00 means that beamlock is not used.

T1, T2, T3 are used to indicate the time. T1, T2, T3=000 means zero delay or a preset delay value, when T1, T2, T3=non-zero values, it can indicate 7 (e.g. $2^3-1$) different preset delay values, respectively. As an example, three bits are used here, or only one bit, two or more may be used.

This embodiment effectively overcomes the problem present in the first embodiment.

As a third embodiment, after receiving activation of the RF state lock, the lock is activated with a delay, and when a specific uplink signal is transmitted in the non-connected state (e.g., when the first PRACH signal is transmitted or when a preset number of PRACH signals are transmitted), the lock is activated, and de-activated after entering into the connected state again.

In this embodiment, the beamlock related information may include time delay information for activating or de-activating the beamlock.

In a further embodiment, the time delay information may indicate a time period from the moment when the UE receives the first message in the connected state to the moment when the beamlock is activated or de-activated, or a time period from the moment when the UE enters into the non-connected state to the moment when the beamlock is activated or de-activated.

This implementation is a trigger mechanism for the event dimension, which allows activating the lock function pre-cisely as needed when a lock mode is required. The activation steps are shown in FIG. 8.

Figure 8:
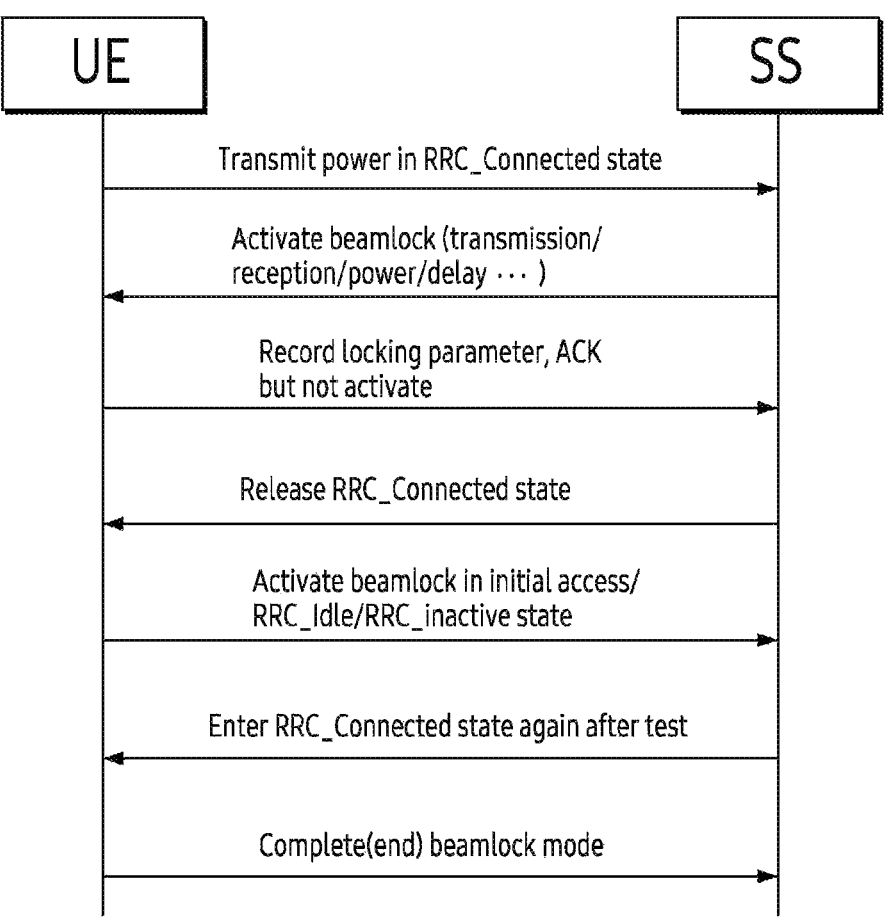
FIG. 8 illustrates a schematic diagram of delay activating the beamlock function according to an example embodiment.

FIG. 8 illustrates a schematic diagram of delayed activating the beamlock function according to an embodiment of the present disclosure. As shown in FIG. 8, the UE is in a RRC connected state and transmits a power in this state. Then, upon receiving activation of a new lock mode (or beam/power/period), the UE records locking parameters, but delays (holds) the activation. When the UE is in an initial access/RRC_Idle/RRC_inactive state, the lock mode is activated when a specific uplink signal is emitted (e.g. when the first PRACH signal is emitted or when a preset number of PRACH signals are emitted). In an alternative embodiment, the lock mode activated here may not use the recorded locking parameters, but use for example the currently available or preset locking parameters of the UE. The UE completes (or ends) the lock state when the UE enters into the RRC connected state again after testing. In an alternative embodiment, the locking parameters may be selected by the UE itself after it has entered into the non-connected state.

Thus, the beam for performing the beamlock related operation may include the beam the UE is using at the time of receiving the first message, or the beam the UE is using at the time of performing the beamlock related operation.

The way of de-activating the lock may be done in the same way as the conventional UBF mechanism, e.g. by receiving a de-activation message from the network node in the connected state. The lock state may be automatically de-activated after the user equipment enters into the connected state again, or by other de-activation mechanisms mentioned in "RF state lock function in the non-connected state (idle and inactive state)".

As a fourth embodiment, the message for activating the RF state lock function transmitted by the network node contains information indicating the power.

In the connected state, the power control of the terminal is closed-loop power control, and the network node can adjust the power of the terminal device to reach the maximum/high through the power control command, and then perform power measurement to verify whether the terminal meets the power metric and beam correspondence in the connected state. In the idle state and the inactive state, the power control of the terminal is open-loop power control, and the transmitting power of the terminal cannot be pre-cisely controlled. Depending on different network environ-ments, the transmitting power of the terminal will be changed accordingly, or even if the network environment remains unchanged, the transmitting power of the terminal will be changed because of changes in the directionality of and antenna gain of the terminal antenna when the spatial location or orientation of the terminal is changed. With this embodiment, the problem that the current UBF function can only lock the direction of the beam, e.g., the direction of the transmitting power but cannot lock the magnitude of the transmitting power may be solved. Thus, a new lock func-tion may be realized, e.g., the maximum/high transmitting power of the terminal may be locked, and the terminal may be stabilized to reach the maximum/high transmitting power state in the non-connected state.

The previous embodiments do not mention which locking parameters are needed when activating the RF state lock function, but the transmitting beam is a necessary parameter by default. Although the previous embodiments did not mention specific locking parameters, they are not limited to only locking the transmitting beam. This embodiment only serves as an example to introduce the method of locking parameters other than the beam.

In this embodiment, the beamlock related information may include information indicating a transmitting power of an uplink signal in the non-connected state.

In a specific embodiment, the information indicating the transmitting power of the uplink signal in the non-connected state may include at least one of: a maximum or high transmitting power of the UE, a configured maximum trans-mitting/high power (Pcmax), an immediate transmitting power of the UE when the UE receives the first message, and an immediate transmitting power of the UE when the UE performs activating the beamlock.

This embodiment allows setting the power to be config-ured when the user equipment performs uplink signal trans-mission in the non-connected state by a preset power or a power indicated by information carried in the message for activating the RF state lock transmitted by the network node.

When the information indicating the power is carried in the message for activating the RF state lock transmitted by the network node (specified in Table 2 below), it may be indicated by configuring one or more bits, with a value of 1, when the number of bits is one, indicating need to transmit the uplink signal in the non-connected state according to the preset power (e.g., the maximum transmitting power or the stored power), and a value of 0 indicating no need to transmit according to the preset power.

In this case, the UE beamlock test function is shown as follows:

TABLE 2

| 8 | 7 | 6 | 5 | 4 | 3 | 2 | 1 | Bit number |
|---|---|---|---|---|---|---|---|---|
| | | | | | P | X1 | X2 | Octet 1 |

Where X1, X2=01 is used to activate beamlock for Tx only, X1, X2=10 is used to activate beamlock for Rx only, and X1, X2=11 is used to activate beamlock for both Tx and RX.

Note that X1, X2=00 when the beamlock is not used.

Where P denotes a power. P=0 means no power lock and P=1 means power lock. As an example, one bit is used here, or just two or more bits may be used to indicate more power information to be locked. The bit number of 3 is used here, and different bits may be used when the beam state lock related information for activation or de-activation contains more than one piece of information.

The effect of this embodiment is that the user equipment can avoid the complexity and inaccuracy of the open-loop power control in the non-connected state and can achieve the maximum transmitting power state in the non-connected state simply and efficiently and accurately.

As a fifth embodiment, the message for activating the RF state lock function transmitted by the network node contains information indicating a power.

The transmission running time of the uplink signal in the non-connected state is short, and in order to perform stable and reliable measurements, this embodiment may indicate the transmission running time of the uplink signal, such as the transmission running time of the msg1, through the information carried in the message for activating the RF state lock transmitted by the network node, which ensures the accuracy of the msg1 uplink power measurement.

In this embodiment, the beamlock related information may include at least one of the information of the uplink signal in the non-connected state and the transmission running time of the uplink signal in the non-connected state.

The way of the information carried in the activation message indicating the transmission running time of the uplink signal may be implemented by one or more bits in Table 3 below. When the number of bits is 3, at least one of eight time values may be indicated from a preset enumeration value.

In this case, the UE beamlock test function is shown in Table 3:

TABLE 3

| 8 | 7 | 6 | 5 | 4 | 3 | 2 | 1 | Bit number |
|---|---|---|---|---|---|---|---|---|
|   |   |   | Y1 | Y2 | P | X1 | X2 | Octet 1 |

Where X1, X2=01 is used to activate beamlock for Tx only, X1, X2=10 is used to activate beamlock for Rx only, X1, X2=11 is used to activate beamlock for both Tx and RX.

Note that X1, X2=00 when the beamlock is not used.

Where P indicates a power. P=0 means no power lock and P=1 means power lock. Wherein, when P=1, Y1, Y2=00 indicates no running time for the uplink signal (such as PRACH or msg1) or indicates a preset time, and Y1, Y2=non-zero value indicates 3 (e.g., $2^2-1$) preset running times for the uplink signal (such as PRACH or msg1).

With the above embodiment, the problem that the transmission running time of the uplink signal (such as PRACH, msg1, msg3, msgA, etc.) is very short leads to unstable test results may be solved.

As a sixth embodiment, the message for activating the RF state lock function transmitted by the network node contains information indicating in which state the lock function is effective.

In this embodiment, the beamlock related information may include a message indicating in which state the UE is maintaining or activating the beamlock.

In a specific embodiment, the message indicating in which state the UE maintains or activates the beamlock may include at least one of: a message indicating that the beamlock is maintained or activated in a case of entering into the non-connected state, and a message indicating that the beamlock is activated in a case of the UE receiving a particular command.

In a further embodiment, the message indicating that the beamlock is maintained or activated in the case of entering into the non-connected state may include at least one of a message indicating that the beamlock is maintained or activated in a case of entering into an inactive state, and a message indicating that the beamlock is maintained or activated in a case of entering into an idle state. In addition, in this case, it is still compatible with the existing UBF process of performing locking in the connected state and also performing locking in the indicated non-connected state. In a case that the message for activating the RF state lock function transmitted by the network node does not contain the information indicating in which state the lock function is effective, it is fully compatible with the existing UBF process of performing locking in the connected state and de-activating the lock in the non-connected state.

At this point, the UE beamlock test function is shown in Table 4:

TABLE 4

| 8 | 7 | 6 | 5 | 4 | 3 | 2 | 1 | Bit number |
|---|---|---|---|---|---|---|---|---|
|   |   |   |   |   | S | X1 | X2 | Octet 1 |

Where X1, X2=01 is only used to activate beamlock for Tx, X1, X2=10 is only used to activate beamlock for Rx, and X1, X2=11 is used to activate beamlock for both Tx and Rx.

Note that X1, X2=00 when the beamlock is not used.

Where S represents a state. S=0 means that the lock function applies only to the connected state, S=1 means that the lock function applies to the non-connected state, or applies to both the connected state and the non-connected state. As an example, one bit is used here, or only two or more bits may be used to indicate more information applicable to RRC states. The bit number of 3 is used here, and different bits may be used when the beam state lock related information for activation or de-activation contains more than one piece of information.

The above embodiments are only a few exemplary implementations, and various combinations are within the scope of the present disclosure.

In addition, the method shown in FIG. 7 may also include that the UE transmits an uplink signal to the network node in the non-connected state. The network node may determine whether the UE is in a maximum transmitting power state based on the uplink signal transmitted by the UE. Specifically, if no acknowledgement response message for the uplink signal is received from the network node, the transmitting power of the UE may be adjusted upwards (power ramping) and then an uplink signal may be transmitted to the network node based on the adjusted transmitting power.

For example, in the idle or inactive state of radio resource control, the maximum transmitting power of the user equipment in a particular direction in the three-dimensional space may be determined, and then the uplink signal is transmitted in the particular direction in accordance with the determined maximum transmitting power.

For another example, the network node may determine that the UE is in the maximum transmitting power state after receiving a predefined number of uplink signals. For example, when the UE is changed from the connected state to the non-connected state, it starts counting the number of times the UE transmits uplink signals and may determine that the UE is in the maximum transmitting power state after reaching a predefined number of times. Counting the number of times the UE transmits uplink signals is not limited to this, but may also be done at a preset moment or within a preset time period, etc.

As a first example, the user equipment may determine the transmitting power of the user equipment based on a reference signal received from the network node. The uplink signal transmitted by the user equipment may be used by the network node to measure the corresponding transmitting power of the user equipment, and the user equipment may be determined to be in the maximum transmitting power state after the user equipment transmits a predefined number of uplink signals (e.g., PRACH), or, in a case where a difference between transmitting powers obtained from two adjacent measurements reaches a predefined threshold. For example, the maximum transmitting power state may be understood as the user equipment transmitting an uplink signal in a particular direction in the three-dimensional space in accordance with the corresponding maximum transmitting power. Here, the particular direction may denote a direction in which the user equipment transmits the uplink signal in the three-dimensional space.

In the idle state or in the inactive state, the user equipment may perform the uplink signal transmitting process cyclically. For example, the uplink signal transmitting process may include a random access process (such as a process of transmitting an uplink signal of msg1, msg3, or msgA by the user equipment illustrated in FIG. 4a and FIG. 4b) and other uplink signal transmitting processes. The network node may measure the corresponding transmitting power of the user equipment during each execution of the random access process or the uplink signal transmitting process. The user equipment may be determined to be in the maximum transmitting power state after the user equipment transmits a predefined number of uplink signals (e.g., PRACH) or in the case where the difference between the transmitting powers obtained from two adjacent measurements reaches the predefined threshold.

When measuring the transmitting power in the particular direction in the three-dimensional space, the user equipment may cyclically perform the random access process or the uplink transmitting process in an idle or inactive state, and the network node may measure the corresponding transmitting power during each random access process or uplink transmitting process and reduce the power of the reference signal to be transmitted next time. When the difference between the transmitting powers from two adjacent measurements reaches the predefined threshold, the last measured transmitting power is determined as the maximum transmitting power of the user equipment. At this point, it may be determined that the user equipment is in the maximum transmitting power state.

For example, when measuring the transmitting power in a certain direction in space, the user equipment performs the random access process in the idle state (e.g., the four-step random access process of FIG. 4a and the two-step random access process of FIG. 4b) or other transmitting processes in the inactive state cyclically for several times, and the network node measures the corresponding uplink transmitting power every time. Each time the above process is performed, the network node reduces the power of the next downlink reference signal (such as Synchronization Signal/ PBCH Block, SSB signal) transmitted by the network node before the power difference between two adjacent measurements is less than the predefined threshold (such as 0.5 dB) or tends to zero, and the user equipment is determined to be in the maximum transmitting power state. The user equipment may use the power maintained to transmit in that state thereafter as the maximum transmitting power of the user equipment, and then may repeat the above steps in other directions as needed.

According to an embodiment of the present disclosure, given the uncertainty of the test itself, in a case where the power difference $\Delta P$ between two adjacent measurements tends to zero or is less than the predefined threshold (e.g., 0.5 dB) several times in a row, the power of the last measurement is taken as the power of the user equipment in the corresponding direction and the user equipment is determined to be in the maximum transmitting power state. For example, after first determining that the power difference $\Delta P$ between two adjacent measurements tends to zero or is less than the predefined threshold (e.g., 0.5 dB), the above process of determining $\Delta P$ may be performed again before it is determined that $\Delta P$ meets the above requirement several times in a row (e.g., a predefined number of times, such as three times), and the user equipment may be determined to be in the maximum transmitting power state.

Figure 9:
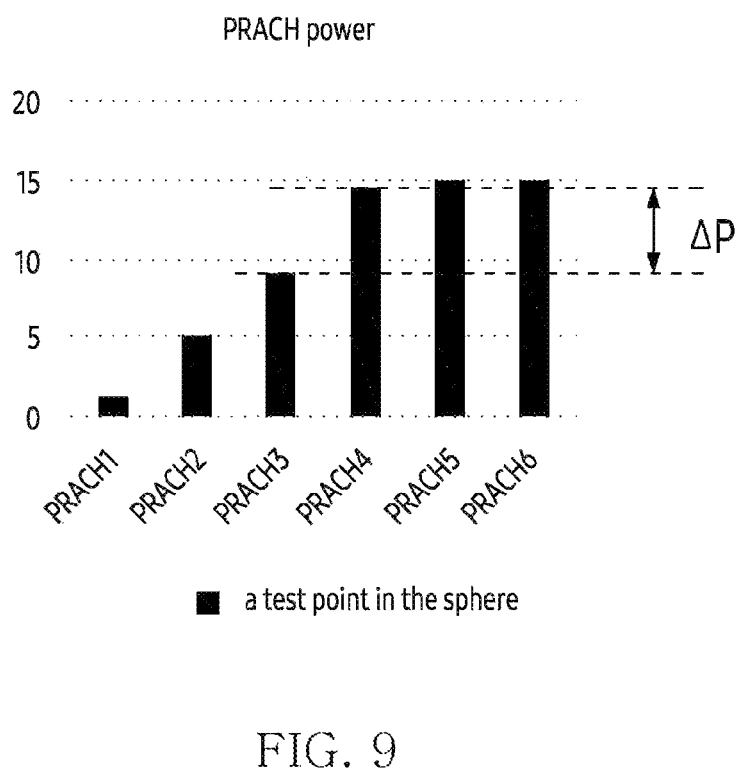

FIG. 9 illustrates a schematic diagram of determining a maximum transmitting power provided by an embodiment of the present disclosure.

Referring to FIG. 9, in measuring a transmitting power in a certain direction in space, the user equipment may cyclically perform a random access process, and the network node may measure a power of a Physical Random Access Channel (PRACH) every time. After the user equipment transmits a predefined number of uplink signals (e.g., PRACH), or when a power difference between two adjacent measurements is less than a predefined threshold, the user equipment is determined to be in the maximum transmitting power state.

The method obtains the maximum transmitting power (e.g., maximum access power) of the user equipment while maximally resembling the actual network by performing access and measurement cyclically for several times.

As a second example, the user equipment may adjust the transmitting power upwards without receiving an acknowledgement response message in response to a previously transmitted uplink signal. The uplink signal transmitted by the user equipment is used by the network node to measure the corresponding transmitting power of the user equipment, and the user equipment is determined to be in the maximum transmitting power state after the user equipment transmits a predefined number of uplink signals (e.g., PRACH), or if the difference between transmitting power obtained from two adjacent measurements reaches the predefined threshold.

The adjusting of the transmitting power upwards by the user equipment may include a method to enable the user equipment to reach the maximum transmitting power as soon as possible, such as the user equipment performs each uplink signal (e.g., PRACH) transmission according to at least one of a maximum preambleReceivedTargetPower parameter (e.g., −60 dBm), a maximum powerRampingStep parameter (e.g., 6 dB), a maximum preambleTransMax parameter (e.g., 200)), and a minimum ra-Response Window parameter (e.g., 1 time slot) so as to achieve the maximum transmitting power in the shortest time.

Specifically, when transmitting the uplink signal, the UE may transmit the uplink signal to the network node according to the transmitting power corresponding to the maximum preambleReceivedTargetPower parameter.

When adjusting the transmitting power of the UE upwards, the UE may adjust the transmitting power of the UE upwards based on the maximum powerRampingStep parameter.

In the process of adjusting the transmitting power of the UE upwards, the UE may adjust the transmitting power upwards in the current beam and transmit an uplink signal in the current beam based on the adjusted transmitting power. When the UE confirms that the configured maximum transmitting power (Pcmax) is reached, if no acknowledgement response message for the uplink signal is received from the network node, the transmitting beam of the uplink signal is adjusted.

After adjusting the transmitting power upwards, the UE may transmit an uplink signal to the network node based on the minimum ra-ResponseWindow parameter, according to the adjusted transmitting power.

In the process of transmitting the uplink signal, the number of times the uplink signal is transmitted to the network node is not greater than the maximum preamble-TransMax parameter.

By this method, the terminal can reach the maximum transmitting power state in the shortest time, thus allowing more time for subsequent tests such as a maximum power test, which ensures that no random access process failure occurs during the test and saves test time.

When performing the random access process or uplink transmitting process in the idle or inactive state, the user equipment can transmit uplink signals and continuously adjust the transmitting power upward. The network node can measure the corresponding transmitting power each time the transmitting power is adjusted upward. After the user equipment transmits a predefined number of uplink signals (e.g., PRACH), or if the difference between transmitting power obtained from two adjacent measurements reaches the predefined threshold, the user equipment is determined to be in the maximum transmitting power state, and the user equipment may use the power maintained to transmit in that state thereafter as the maximum transmitting power of the user equipment.

When measuring the transmitting power in a particular direction in the three-dimensional space, the user equipment transmits uplink signals and continuously adjusts the transmitting power upward while performing the random access process or the uplink signal transmitting process in the idle state or in the inactive state. The network node may not feed back an acknowledgement response message for the uplink signal to the user equipment before the user equipment transmits a preset number of uplink signals (e.g., PRACH) or the difference between transmitting power obtained from two adjacent measurements reaches the predefined threshold. Then the network node conducts a test such as a maximum power test after determining that the user equipment is in the maximum transmitting power state and beamlock state, and transmits the acknowledgement response message after the test is completed. For example, the network node may delay transmitting the acknowledgement response message for an uplink signal or random access signal after receiving the uplink signal or random access signal, and measure the corresponding transmitting power each time the transmitting power is adjusted upward. After the user equipment transmits a predefined number of uplink signals (e.g., PRACH), or when the difference between transmitting power obtained from two adjacent measurements reaches the predefined threshold, the user equipment is determined to be in the maximum transmitting power state, and the user equipment may use the power maintained to transmit in that state thereafter as the maximum transmitting power of the user equipment.

Figure 10:
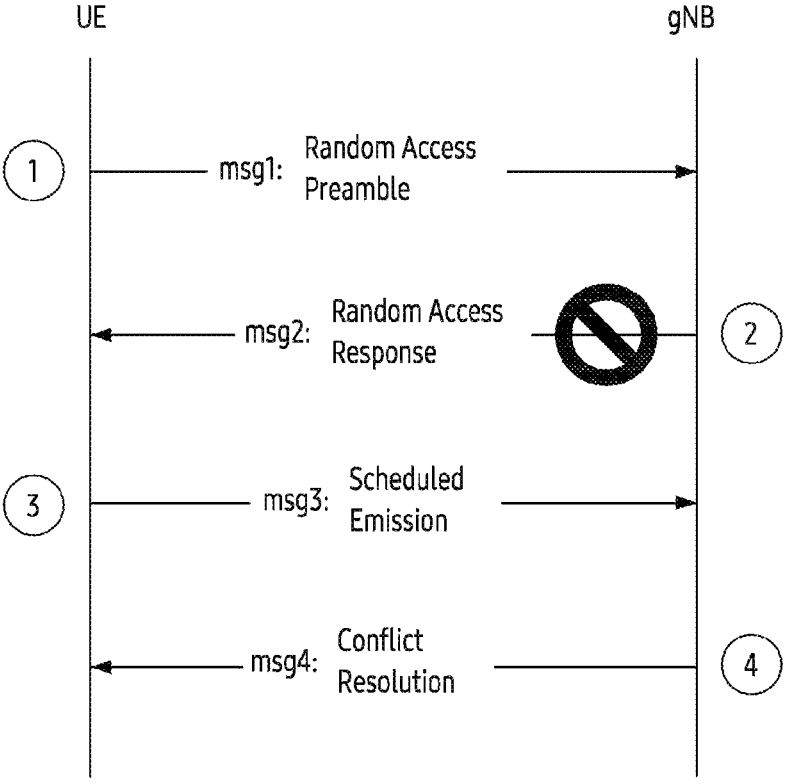
FIG. 10 illustrates a schematic diagram of holding a random access response provided by an example embodiment.

FIG. 10 illustrates a schematic diagram of holding a random access response provided by an embodiment of the present disclosure.

Referring to FIG. 10, when measuring a transmitting power in a certain direction in space, the user equipment performs the random access process in the idle state or other transmitting processes in the inactive state, and the network node does not transmit (or holds) an acknowledgement response message (e.g., Random Assess Response (RAR) message) to the user equipment after receiving the uplink signal from the user equipment (e.g., random access preamble), but waits for the user equipment to continuously adjust the transmitting power upward before the user equipment transmits a preset number of uplink signals (e.g., PRACH), or the power difference $\Delta P$ between two adjacent measurements tends to zero or is less than a predefined threshold (e.g., 0.5 dB), the user equipment is determined to be in the maximum transmitting power state, and the user equipment may use the power maintained to transmit in this state thereafter as the maximum transmitting power of the user equipment, and then the user equipment may repeat the above steps in other directions as needed. For example, the user equipment may perform multiple PRACH transmission in testing mode(or test mode) based on activating beamlock. The network node may hold RAR message in response to receiving at least one uplink signal (e.g., PRACH).

This method does not require multiple cycles of the random access process or other transmitting processes to achieve transmitting at the maximum access power by the user equipment, and solves the problem of the beam correspondence simply and efficiently.

In one possible embodiment of the present disclosure, the user equipment may be pre-configured to a test mode, for example, when the user equipment enters into the non-connected state, the test mode is activated.

The test mode may be set to enable the user equipment to transmit uplink signals using a maximum transmitting power and/or perform a beamlock related operation in the non-connected state. The test mode herein may include the lock mode as described above.

The test mode may be activated automatically when the user equipment is in the idle or inactive state, such that the user equipment is in the test mode. The test mode of the present disclosure is set to transmit uplink signals using a maximum transmitting power (e.g., Pcmax). The test mode may be used to determine the maximum transmitting power.

In another possible embodiment, the user equipment is instructed by the network node to activate the test mode. Specifically, the user equipment may receive an indication information for activating the test mode of the user equipment (e.g., the first message, but also another indication information) from the network node, and in the idle state or in the inactive state, the user equipment activates the test mode based on the indication information.

For example, the method may provide a test function or test mode where the uplink transmitting power of the user equipment, when the user equipment enters into the test mode, may bypass the open-loop power control algorithm and directly transmit the uplink signal using the maximum transmitting power (e.g. Pcmax) and/or perform the beamlock related operation. This test mode may be triggered and/or de-activated by signaling interaction between the terminal and the network node side, or by presetting on the user equipment side. The test function/mode may be automatically deactivated when the user equipment enters into the connected state (RRC_connected) or a state other than the idle and inactive states. When the user equipment enters into this test mode state, it may lock the transmitting beam in addition to the maximum transmitting power.

As an alternative embodiment, after entering into the test mode, the uplink transmitting power of the terminal is still derived according to the open-loop power control algorithm after the user equipment enters into the test mode state. Without transmitting the response message 2 (msg2) from the network device, the user equipment repeats transmitting the msg1 according to a pattern of "firstly adjusting the power up to the maximum power (e.g. Pcmax) and then performing beam optimization". The user equipment is determined to be in the maximum transmitting power state when it transmits a predefined number of uplink signals or when the difference between transmitting powers obtained from two adjacent measurements reaches a predefined threshold, and the optimal beam is locked, thus achieving the measurement of the beam correspondence and the transmitting power in the non-connected state.

The method is highly reliable by locking the beam and/or power through the specialized test functions/mode.

Figure 11:
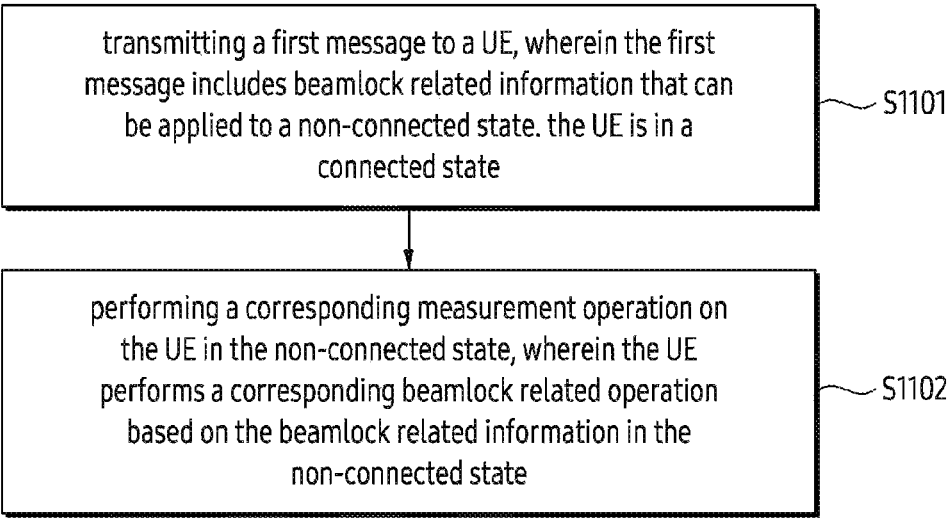
FIG. 11 and FIG. 12 illustrate a flowchart of a communication method performed by a network node in a communication system provided by an example embodiment.

FIG. 11 illustrates a flowchart of a communication method performed by a network node in a communication system provided by an embodiment of the present disclosure.

At step 1101, a first message is transmitted to the UE. The first message may include beamlock related information that can be applied to the non-connected state. In this step, it may be determined whether the UE is in the non-connected state. For example, the network node may obtain UE state-related information, and determine whether the UE is in the non-connected state based on the UE state-related information. When the UE is in the connected state, the first message is transmitted to the UE.

At step S1102, a corresponding measurement operation is performed for the UE in the non-connected state, wherein the UE performs a corresponding beamlock related operation in the non-connected state based on the beamlock related information.

Figure 12:
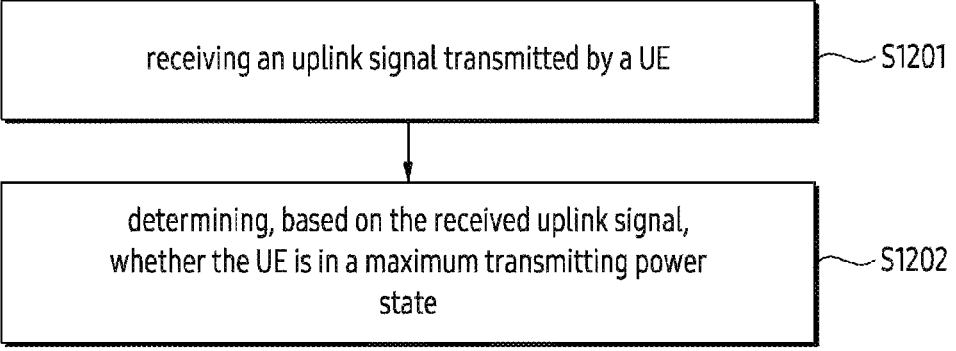

The method illustrated in FIG. 11 may further include steps of a method illustrated in FIG. 12.

At step 1201, an uplink signal transmitted by the user equipment in the non-connected state is received. The uplink signal may include, for example, a physical random access channel (PRACH) signal and/or an uplink physical shared channel (PUSCH) signal.

At step 1202, based on the received uplink signal, it is determined whether the user equipment is in the maximum transmitting power state. The maximum transmitting power state may be understood as the user equipment transmitting the uplink signal in a particular direction in the three-dimensional space in accordance with a corresponding maximum transmitting power.

The method illustrated in FIG. 12 enables the beam correspondence test and the transmitting power test of FR2 millimeter wave communication at the network node in the idle and inactive states.

As a first example, after receiving the uplink signal from the user equipment, the network node may continue to transmit a reference signal with a number (index) of a previous reference signal to the user equipment. The received uplink signal from the user equipment is measured while the user equipment is in the idle or inactive state of radio resource control, and the power of a next reference signal transmitted by the network node is reduced. The network node may determine that the user equipment is in the maximum transmitting power state if the difference between transmitting powers obtained from two adjacent measurements reaches a predefined threshold.

The user equipment may cyclically perform the random access process or the uplink signal transmitting process in the idle state or in the inactive state. After receiving the uplink signal from the user equipment, the network node may continue to transmit a reference signal with the number (index) of the previous reference signal to the user equipment. The network node may measure each received uplink signal transmitted by the user equipment and reduce the power of the next reference signal transmitted by the network node. In the case where the difference between transmitting powers obtained from two adjacent measurements reaches the predefined threshold, the network node may determine that the user equipment is in the maximum transmitting power state.

In the case where the user equipment cyclically performs the random access process or the uplink transmitting process in the idle state or in the inactive state, the network node may measure the corresponding transmitting power each time the user equipment performs the random access process or the uplink transmit process, and reduce the power of the next reference signal transmitted by the network node. The last measured transmitting power may be determined as the maximum transmitting power of the user equipment when the difference between transmitting powers obtained from two adjacent measurements reaches the predefined threshold.

For example, when measuring the transmitting power in a certain direction in space, the user equipment performs the random access process in the idle state (e.g., the four-step random access process of FIG. 4a and the two-step random access process of FIG. 4b) or other transmitting processes in the inactive state cyclically for several times, and the network node measures the corresponding uplink transmitting power every time. Each time the above process is performed, the power of the next downlink reference signal (such as Synchronization Signal/PBCH Block, SSB signal) transmitted by the network node is reduced before the power difference between two adjacent measurements is less than the predefined threshold (such as 0.5 dB) or tends to zero. At this time, the last measured transmitting power may be selected as the power for that direction, and then the above steps may be repeated in other directions as needed.

As a second example, while the user equipment is in the idle or inactive state of radio resource control, the network node may not fed back an acknowledgement response message for the uplink signal to the user equipment before it is determined that the user equipment is in the maximum transmitting power state. The acknowledgement response message is fed back after the corresponding test (such as a power test or beam correspondence test) is completed while the user equipment is in the maximum transmitting power state and/or the beamlock state.

The user equipment may perform the random access process or the uplink transmitting process in the idle or inactive state. The network node may receive uplink signals from the user equipment. The uplink signal may include, for example, a physical random access channel (PRACH) signal and/or an uplink physical shared channel (PUSCH) signal. The network node may measure the received uplink signal from the user equipment and may not provide the acknowledgement response message for the uplink signal to the user equipment before a predefined number of uplink signals (e.g., PRACH) are received from the user equipment, or before the difference between transmitting powers obtained from two adjacent measurements reaches the predefined threshold, and the user equipment may be determined to be in the maximum transmitting power state. After performing the test such as the maximum power test in this state, this acknowledgement response message is fed back.

When the user equipment performs the random access process or the uplink signal transmitting process in the idle state or in the inactive state, the network node, after receiving the random access signal or the uplink signal transmitted by the user equipment, may delay (hold) transmitting the acknowledgement response message for the random access signal or the uplink signal to the user equipment, wait for the user equipment to continuously adjust the transmitting power upward, and measure the transmitting power corresponding to each time the user equipment adjusts the transmitting power upward. Before a predefined number of uplink signals (e.g. PRACH) are received from the user equipment, or, the difference between transmitting powers obtained from two adjacent measurements reaches the predefined threshold, the user equipment may be determined to be in the maximum transmitting power state, after which the maximum power measurement is performed with the UE in the maximum transmitting power state and in the beamlock state, and the measurement result may be determined as the maximum transmitting power of the user equipment. In addition to the maximum power measurement, other tests may also be performed.

For example, when measuring a transmitting power in a certain direction in space, the user equipment performs the random access process in the idle state or other transmitting processes in the inactive state, and the network node does not transmit an acknowledgement response message (e.g., Random Assess Response (RAR) message) to the user equipment after receiving the uplink signal from the user equipment (e.g., random access preamble), but waits for the user equipment to continuously adjust the transmitting power upward before the user equipment transmits a preset number of uplink signals (e.g., PRACH), or the power difference $\Delta P$ between two adjacent measurements tends to zero or is less than a predefined threshold (e.g., 0.5 dB). Thereafter, a maximum power measurement is performed, which may be determined as the maximum transmitting power of the user equipment, and then the above steps may be repeated in other directions as needed.

Further, according to the example embodiments, given the uncertainty of the test itself, it may be determined several times in a row that the power difference $\Delta P$ between two adjacent measurements tends to zero or is less than the predefined threshold (e.g., 0.5 dB). For example, after first determining that the power difference $\Delta P$ between two adjacent measurements tends to zero or is less than the predefined threshold (e.g., 0.5 dB), the above process of determining $\Delta P$ may be performed again before it is determined that $\Delta P$ meets the above requirement several times in a row (e.g., a predefined number of times, such as three times), and the user equipment may be determined to be in the maximum transmitting power state. Thereafter, the maximum power measurement is performed and the measurement result may be determined as the maximum transmitting power of the user equipment.

As a third example, while the user equipment is in the idle or inactive state of radio resource control, the network node may transmit an indication message to the user equipment for activating a test mode of the user equipment, wherein the test mode may be set to force the user equipment to transmit an uplink signal using the maximum transmitting power (e.g., Pcmax) and/or to perform the beamlock related operation. The user equipment may activate the test mode upon receipt of the indication message.

The network node may activate the test mode of the user equipment by transmitting the associated indication message or command (e.g., the first message). The test mode is used to determine the maximum transmitting power and also to lock the transmitting beam.

For example, the method may provide a test function or test mode where the uplink transmitting power of the user equipment may bypass the open-loop power control algorithm and directly transmit the uplink signal using the maximum transmitting power and/or perform the beamlock related operation, after the user equipment enters into the test mode. This test mode may be triggered and/or deactivated by signaling interaction between the terminal and the network node side (for example, the network node may transmit a downlink signal to the user equipment to trigger the test mode on or off), or by presetting on the user equipment side. The test function/mode may be automatically deactivated when the user equipment enters into the connected state (RRC_connected) or a state other than the idle and inactive states. In addition, after the user equipment enters into this test mode state, it may lock the transmitting beam in addition to the maximum transmitting power.

As a fourth example, the network node may determine a beam peak direction and/or a spherical coverage threshold direction of the user equipment in the connected state of radio resource control, and receive an uplink signal from the user equipment based on the determined beam peak direction and/or spherical coverage threshold direction, while the user equipment is in the idle or inactive state of radio resource control. Then, based on the received uplink signal, it is determined whether the user equipment is in the maximum transmitting power state.

For example, the network node may determine the beam peak direction and/or the spherical coverage threshold direction of the user equipment in the connected state of radio resource control, perform a transmitting power measurement in the idle state or in the inactive state based on the beam peak direction and/or the spherical coverage threshold direction (the measurement method may refer to the first example, the second example, or the third example above), and determine a peak maximum transmitting power or spherical coverage transmitting power.

In addition, the network node may determine polarization directions corresponding to the beam peak direction and/or polarization directions corresponding to the spherical coverage threshold direction of the user equipment in the connected state of radio resource control. Based on a polarization direction with the maximum transmitting power among the two polarization directions corresponding to the beam peak direction and/or a polarization direction with the maximum transmitting power among the two polarization directions corresponding to the spherical coverage threshold direction, an uplink signal transmitted by the user equipment is received while the user equipment is in the idle state or inactive state of radio resource control. Then, based on the received uplink signal, it is determined whether the user equipment is in the maximum transmitting power state.

For example, the network node may determine polarization directions corresponding to the beam peak direction and/or polarization directions corresponding to the spherical coverage threshold direction of the user equipment in the connected state of radio resource control, and perform a transmitting power measurement in the idle state or in the inactive state based on the polarization direction corresponding to the beam peak direction with higher power and/or the polarization direction corresponding to the spherical coverage threshold direction with higher power (the measurement method may refer to the first example, the second example or the third example above) to determine the peak maximum transmitting power or the spherical coverage transmitting power of the user equipment in the idle or inactive state.

In a case that the beam peak direction or the spherical coverage threshold direction in the connected state of radio resource control is one direction, the network node may select the transmitting power in the polarization direction with relatively large transmitting power as the maximum transmitting power of the user equipment, based on the transmitting powers in the polarization directions (such as the theta polarization direction and the phi polarization direction) corresponding to the beam peak direction or the spherical coverage threshold direction.

For example, the 50%-tile CDF (Cumulative Distribution Function) direction in the connected state may be used as the spherical coverage threshold direction. The beam correspondence in the idle and inactive states may be performed in the above spherical coverage threshold direction and corresponding polarization direction(s) thereof. The network node may perform a maximum transmitting power measurement in the idle or inactive state in the 50%-tile CDF direction of the connected state (the measurement method may be referred to the first example, the second example, or the third example above) to determine the peak maximum transmitting power or spherical coverage transmitting power of the user equipment in the idle or inactive state. Here, the maximum transmitting power measurement in the idle or inactive state may also be performed only in the polarization direction(s) corresponding to the beam peak direction or in the polarization direction(s) corresponding to the spherical coverage threshold direction.

In a case that there are multiple beam peak directions, the network node may interpolate transmitting powers obtained by measuring uplink signals received in the multiple beam peak directions to obtain the transmitting power of the user equipment. In addition, in a case that there are multiple spherical coverage threshold directions, the network node may interpolate transmitting powers obtained by measuring uplink signals received in the multiple spherical coverage threshold directions to obtain the transmitting power of the user equipment. After receiving a predefined number of uplink signals (e.g., PRACH) from the user equipment, or, in the case that the difference between transmitting powers obtained from two adjacent measurements reaches a predefined threshold, the network node may determine that the user equipment is in the maximum transmitting power state.

In addition, in the case that there are multiple beam peak directions, the network node may receive an uplink signal transmitted by the user equipment when the user equipment is in the idle or inactive state of radio resource control, based on a polarization direction with the maximum transmitting power of the two polarization directions corresponding to each beam peak direction. The network node may interpolate transmitting powers obtained by measuring uplink signals received in polarization directions with the maximum transmitting power corresponding to the multiple beam peak directions to obtain the transmitting power of the user equipment. The network node may determine that the user equipment is in the maximum transmitting power state after receiving a predefined number of uplink signals (e.g., PRACH) from the user equipment, or in the case where the difference between transmitting powers obtained from two adjacent measurements reaches the predefined threshold.

In the case that there are multiple spherical coverage threshold directions, the network node may receive an uplink signal transmitted by the user equipment when the user equipment is in the idle or inactive state of radio resource control, based on a polarization direction with the maximum transmitting power of the two polarization directions corresponding to each spherical coverage threshold direction. The network node may interpolate transmitting powers obtained by measuring uplink signals received in polarization directions with the maximum transmitting power corresponding to the multiple spherical coverage threshold directions, to obtain the transmitting power of the user equipment. The network node may determine that the user equipment is in the maximum transmitting power state after receiving a predefined number of uplink signals (e.g., PRACH) from the user equipment, or in the case where the difference between transmitting powers obtained from two adjacent measurements reaches the predefined threshold.

In the case that there are multiple beam peak directions or multiple spherical coverage threshold directions, the polarization directions corresponding to each of the multiple beam peak directions or the polarization directions corresponding to each of the multiple spherical coverage threshold directions are determined. The transmitting powers in the polarization directions corresponding to each of the multiple beam peak directions or the transmitting powers in the polarization directions corresponding to each of the multiple spherical coverage threshold directions are interpolated to obtain the maximum transmitting power of the user equipment.

For example, in a case that there is two 50%-tile CDF directions in the connected state, the network node may measure the maximum transmitting power corresponding to each 50%-tile CDF direction in the idle state or inactive state, respectively, and interpolate the transmitting powers of the two 50%-tile CDF directions or average the transmitting powers corresponding to the two 50%-tile CDF directions as the maximum transmitting power of the spherical coverage of the user equipment. Here, the maximum transmitting power measurement in the idle or inactive state may also be performed only in the polarization direction(s) corresponding to the 50%-tile CDF direction in the connected state. As a fifth example, since the current technology is unable to lock the beam in the non-RRC_connected state, network simulators and other test devices, in many cases, can only test one polarization direction at the same moment. To solve the above problem, the present disclosure may obtain a component power and a polarization compensation power based on an uplink signal transmitted by the user equipment when the user equipment is in first polarization, where the first polarization is polarization with a larger power among theta polarization and phi polarization. The sum of the component power and the polarization compensation power of the first polarization is determined as the transmitting power of the user equipment. In the case where the difference between the transmitting powers obtained from two adjacent measurements reaches the predefined threshold, it is determined that the user equipment is in the maximum transmitting power state.

Specifically, while the user equipment is in the idle or inactive state of radio resource control, the user equipment transmits an uplink signal to the network node, and the network node may measure the uplink signal transmitted by the user equipment to obtain the component power corresponding to the first polarization.

In determining the polarization compensation power, a total power and the component power of the first polarization measured when the user equipment is in the first polarization in the connected state of radio resource control may be determined, and a difference between the total power and the component power of the first polarization is taken as the polarization compensation power. The polarization compensation power ideally should not be greater than 3 dB, and may take the value of 3 dB if it is greater than 3 dB.

The power of the connected state (such as an effective isotropic radiated power (EIRP)) may be measured by setting link antenna(s) in the theta polarization, and establishing a communication connection, and then locking the beam of the terminal, adjusting test antenna(s) as the theta polarization and the phi polarization respectively, so as to obtain the theta component and the phi component of the transmitting power of the terminal. Then the link antenna(s) is switched to the phi polarization, and the theta and phi components are measured, respectively. For example, the transmitting power EIRP of the terminal may be determined according to the following Equations (1) to (3):

$$EIRP(Pol_{Link}=\theta)=EIRP(Pol_{Meas}=\theta,Pol_{Link}=\theta)+EIRP \\ (Pol_{Meas}=\Phi,Pol_{Link}=\theta) \tag{1}$$

$$EIRP(Pol_{Link}=\Phi)=EIRP(Pol_{Meas}=\theta,Pol_{Link}=\Phi)+EIRP \\ (Pol_{Meas}=\Phi,Pol_{Link}=\Phi) \tag{2}$$

$$EIRP=maximum(EIRP(Pol_{Link}=\theta),EIRP(Pol_{Link}=\Phi)) \tag{3}$$

where $EIRP(Pol_{Link}=\theta)$ denotes the EIRP when the antenna is in the theta polarization, $EIRP(Pol_{Meas}=\theta, Pol_{Link}=\theta)$ denotes the theta component of the transmitting power of the terminal measured when the antenna is in the theta polarization, $EIRP(Pol_{Meas}=\Phi, Pol_{Link}=\theta)$ denotes the phi component of the transmitting power of the terminal measured when the antenna is in theta polarization, $EIRP(Pol_{Link}=\Phi)$ denotes the EIRP when the antenna is in the phi polarization, $EIRP(Pol_{Meas}=\theta,Pol_{Link}=\Phi)$ denotes the theta component of the transmitting power of the terminal measured when the antenna is in the phi polarization, EIRP $(Pol_{Meas}=\Phi,Pol_{Link}=\Phi)$ denotes the phi component of the transmitting power of the terminal measured when the antenna is in the phi polarization. The addition of the EIRPs in Equations (1) and (2) is a linear addition of power.

In the idle and inactive states, when the link antenna is in the theta polarization $(Pol_{Link}=\theta)$, the phi component (EIRP $(Pol_{Meas}=\Phi,Pol_{Link}=\theta))$ of the transmitting power EIRP of the terminal is generally not measured by the current technology without locking the beam, and when the link antenna is in the phi polarization $(Pol_{Link}=\Phi)$, the theta component $(EIRP(Pol_{Meas}=\theta,Pol_{Link}=\Phi)$ of the transmitting power EIRP of the terminal is generally not measured by the current technology without locking the beam. Therefore, the measured power EIRP of the user equipment in the idle and inactive states is lower than the actual value.

The present disclosure decomposes the transmitting power of the terminal in the idle and inactive states into the single polarization component power and the polarization compensation power, which is described in detail below by taking an example of the link antenna in the theta polarization.

The transmitting power EIRP of the terminal in the idle and/or inactive states may be determined using the following Equation (4):

$$EIRP_{idle\_inactive}(Pol_{Link}=\theta)=EIRP_{idle\_inactive} \\ (Pol_{Meas}=\theta,Pol_{Link}=\theta)+EIRP_{delta} \tag{4}$$

where $EIRP_{idle\_inactive}(Pol_{Link}=\theta)$ denotes the EIRP when the antenna is in the theta polarization in the idle and/or inactive states, $EIRP_{idle\_inactive}$ $(Pol_{Meas}=\theta,Pol_{Link}=\theta)$ denotes the theta component of the transmitting power of the terminal measured when the antenna is in the theta polarization, and $EIRP_{delta}$ denotes the polarization compensation power. The addition of the EIRPs in Equation (4) is a logarithmic addition of power. If the unit is a linear power, the addition needs to be converted to the multiplication.

The single polarization component power may be measured by the test method in the idle and inactive states, and the polarization compensation power may be based on the difference between the transmitting power of the terminal measured when the antenna is in the theta polarization in the connected state and the theta component of the transmitting power of the terminal measured when the antenna is in the theta polarization (the difference is taken if the unit is dBm, or the ratio is taken if the unit is mW), as shown in Equation (5) below:

$$EIRP_{delta}=EIRP_{connected}(Pol_{Link}=\theta)-EIRP_{connected} \\ (Pol_{Meas}=\theta,Pol_{Link}=\theta) \tag{5}$$

where $EIRP_{connected}(Pol_{Link}=\theta)$ denotes the total power measured when the antenna is in the theta polarization, and $EIRP_{connected}(Pol_{Meas}=\theta,Pol_{Link}=\theta)$ denotes the theta component power measured when the antenna is in the theta polarization.

When the link antenna is in the phi polarization, the calculation may be done in a similar way as above.

This method solves the problem that each polarization component in the idle state and inactive state cannot be tested completely, and also reduces the test time.

According to an embodiment of the present disclosure, the network node may also transmit to the UE at least one of the maximum preambleReceivedTargetPower parameter, the maximum powerRampingStep parameter, the minimum ra-Response Window parameter, and the maximum preambleTransMax parameter.

The maximum preambleReceivedTargetPower parameter is used to instruct the UE to transmit an uplink signal to the network node in accordance with a transmitting power corresponding to the maximum preambleReceivedTargetPower parameter.

The maximum powerRampingStep parameter is used to instruct the UE to adjust the transmitting power of the UE upwards based on the maximum powerRampingStep parameter.

The minimum ra-ResponseWindow parameter is used to instruct the UE to transmit an uplink signal to the network node based on the minimum ra-ResponseWindow parameter, according to the adjusted transmitting power.

The maximum preambleTransMax parameter is used to indicate that the number of times the uplink signal is transmitted to the network node is not greater than the maximum preambleTransMax parameter.

The above parameters enable the UE to reach the maximum transmitting power state in the shortest time.

The method and embodiments for determining the maximum power measurement in the non-connected state (idle and inactive states) covered by the present disclosure, and the method and embodiments for the RF state lock function that can be applied in the non-connected state (the idle and inactive state) covered by the present disclosure, may further be used in combination. When the two methods are used in combination, it is necessary to ensure that the user equipment is in the maximum power transmitting state and the user equipment is in the beamlock active state when performing tests such as the maximum power test and/or the beam correspondence test. Several examples of the combination of the two methods are provided below.

Figure 13A:
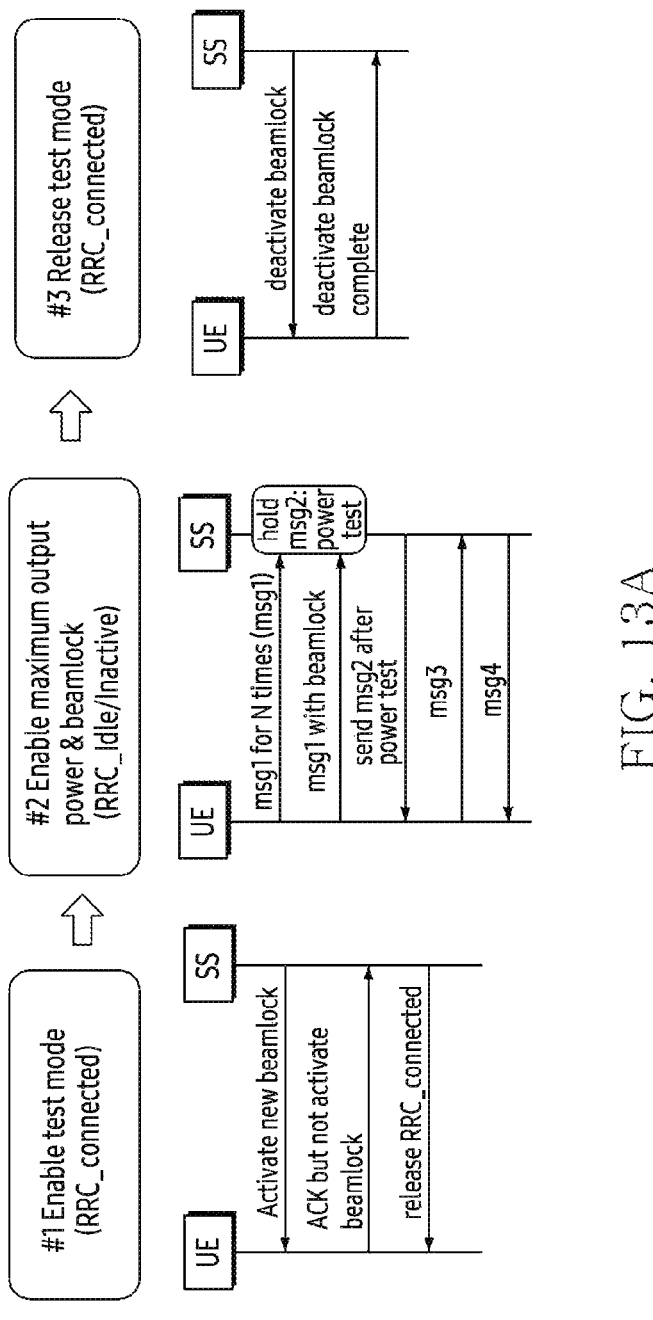
FIG. 13A to FIG. 13C illustrate schematic diagrams of a process in a test mode provided by an example embodiment.

As shown in FIG. 13a, the user equipment receives a message for activating the beamlock (e.g., the first message) transmitted by the network node (e.g., a system simulator (SS)) in the maximum transmitting power state in the connected state (RRC_connected) and feeds back a response (ACK) for the received message, but delays (holds) activating the beamlock. In the non-connected state (RRC_Idle or RRC_Inactive) that the user equipment subsequently enters into, the uplink message 1 (msg1) is transmitted in the inactivated beamlock state, and the SS receives the msg1 but does not transmit the msg2, thus the user equipment may continue to transmit the msg1. After transmitting the msg1 for a preset number of times (N times) in the inactivated beamlock state, the UE may be determined to enter into the maximum transmitting power state. The uplink transmitting signal is transmitted in the locked beam since the (N+1)th transmission of the msg1. The SS starts the power measurement thereafter, transmits the msg2 to the user equipment after the measurement is completed, and then completes the subsequent access process of the msg3 and the msg4. After entering into the connected state, the SS transmits a message for de-activating the beamlock to the user equipment, and the UE receives the message and transmits a de-activated beamlock completion message.

Figure 13B:
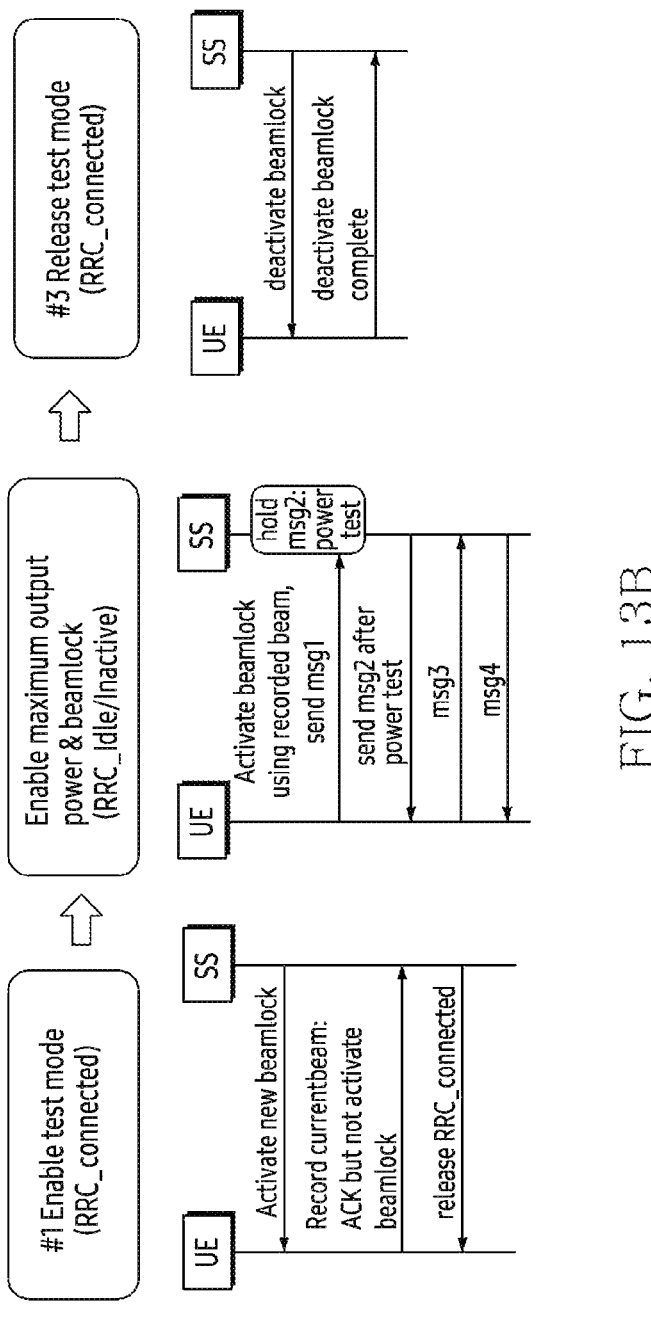

As shown in FIG. 13b, the user equipment receives a message for activating the beamlock (e.g., the first message) transmitted by the network node (e.g., a system simulator (SS)) in the maximum transmitting power state in the connected state (RRC_connected), and then records the currently used beam, feeds back a response (ACK) for the received message, but delays (holds) activating the beamlock. In the non-connected state (RRC_Idle or RRC_Inactive) that the user equipment subsequently enters into, the beamlock is activated through using the previously recorded beam and an uplink message 1 (msg1) is transmitted in this beam. The SS receives the msg1 but does not transmit the msg2, and thus the user equipment may continue to transmit the msg1. The SS starts the power measurement after determining that the UE is in the maximum transmitting power state, transmits the msg2 to the user equipment after the measurement is completed, and then completes the subsequent access process of the msg3 and the msg4. After entering into the connected state, the SS transmits a message for de-activating the beamlock to the user equipment, and the UE receives the message and transmits a de-activated beamlock completion message.

Figure 13C:
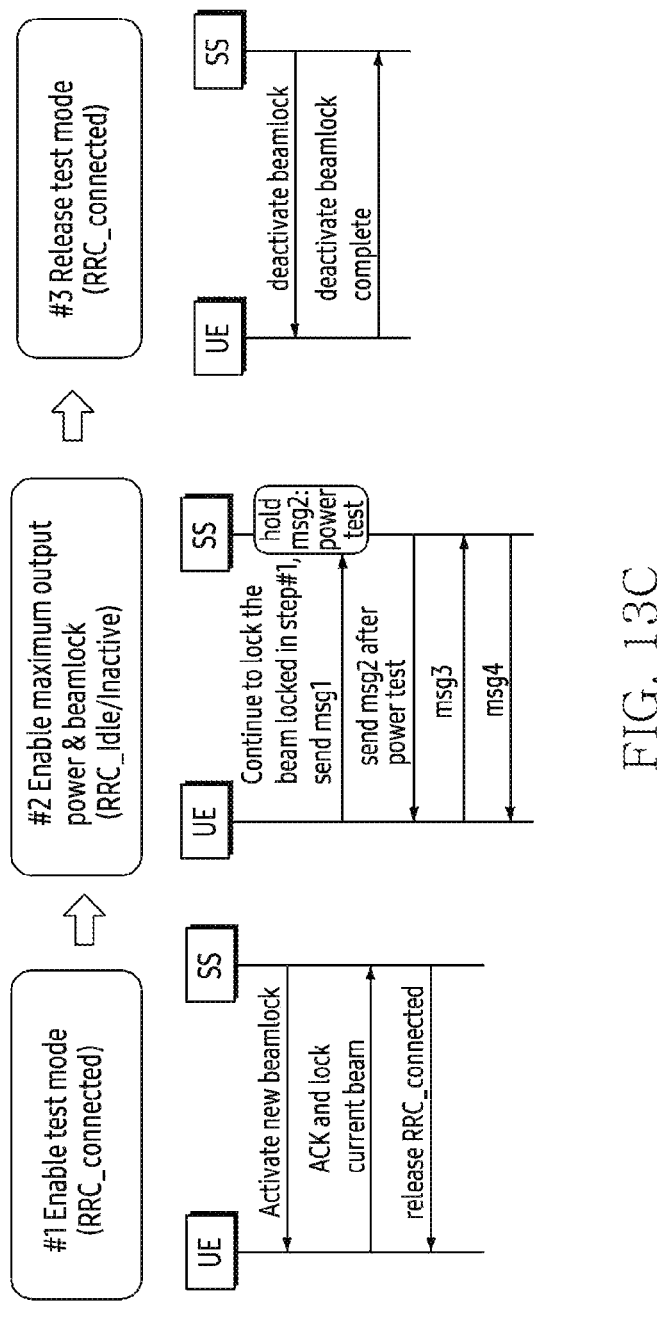

As shown in FIG. 13c, the user equipment receives a message for activating the beamlock (e.g., the first message) transmitted by the network node (e.g., a system simulator (SS)) in the maximum transmitting power state in the connected state (RRC_connected), feeds back a response (ACK) for the received message, and activates the locking of the beam that is being currently used. In the non-connected state (RRC_Idle or RRC_Inactive) that the user equipment subsequently enters into, it continues to lock the beam that is previously locked in the connected state and transmits the uplink message 1 (msg1) in the locked beam. The SS receives the msg1 but does not transmit the msg2, and thus the user equipment may continue to transmit the msg1. The SS starts the power measurement after determining that the UE is in the maximum transmitting power state, transmits the msg2 to the user equipment after the measurement is completed, and then completes the subsequent access process of the msg3 and the msg4. After entering into the connected state, the SS transmits a message for de-activating the beamlock to the user equipment, and the UE receives the message and transmits a de-activated beamlock completion message.

Figure 14:
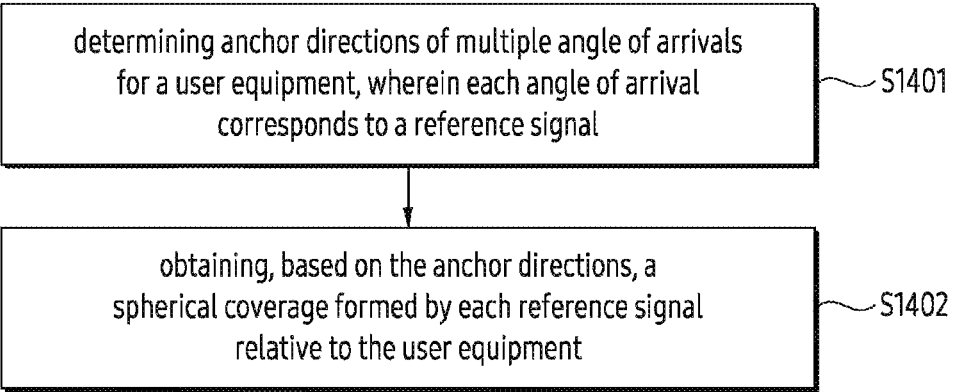
FIG. 14 illustrates a flowchart of a communication method performed by a network node in a communication system provided in an example embodiment.

FIG. 14 illustrates a flowchart of a communication method performed by a network node in a communication system provided in another embodiment of the present disclosure.

For reception and/or transmission in multiple angle of arrivals, the requirements and test of the terminal such as the multi-directional spherical coverage need to be indicated. Unlike single angle of arrival, which may be traversed spatially per direction, the combinations of the multiple angle of arrivals grow geometrically, and even when only two angle of arrivals are considered, the pair of angle of arrivals may be so large as to be practically inoperable. The present disclosure provides an anchor-based method to reduce the geometrically growing combinations of angle of arrivals to a linear multiple of that for the single angle of arrival, e.g., twice of that for the single angle of arrival. The method first lies in specific signal and channel configuration for reception and/or transmission in the multiple angle of arrivals. The user equipment and the network node establish a communication connection in the multiple angle of arrivals, and the network node configures downlink reference signals of different Quasi Co-Located (QCL) type D for different angle of arrivals, e.g., SSB Reference Signals with different QCL type D or CSI-RS Reference Signals with different QCL type D. In correspondence to different downlink reference signals, the user equipment uses different receiving and/or transmitting beams to align with the corresponding angle of arrival of the reference signal. The network node also needs to configure traffic channels (e.g., PDSCHs) for different angle of arrivals, and the spatial relationship between the traffic channel of each angle of arrival and the downlink reference signal needs to be configured as Quasi-Co-Located type D. Preferably, the traffic channels (e.g., PDSCHs) for different angle of arrivals are configured as data transmission with different streams (e.g., 2AoA is configured as 2-layer transmission, e.g., rank 2 transmission). The reference sensitivity of the conventional single angle of arrival may include a receive spherical coverage which is performed under the same data stream, e.g., receive diversity mode. When performing reception test with multiple angle of arrivals, if the transmission between different angle of arrivals is still in the diversity mode, the performance of different angle of arrivals cannot be distinguished, and the above channel configuration solves the problem. The method also lies in providing an anchor for the requirements and tests of such as spherical coverage. For example, the anchor may choose a beam peak direction, use other directions, or use a declared specific direction. The communication in the anchor direction provides only a stable connection. In the anchor direction, the corresponding downlink reference signal power and the uplink transmitting power of the terminal may be appropriately adjusted to meet the communication and test requirements in the non-anchor direction.

The anchor may be regarded as a base station antenna probe in the test system, and the anchor direction may be regarded as an Angle of Arrival (AoA) configured with a reference signal.

Referring to FIG. 14, at step S1401, anchor directions of multiple angle of arrivals for the user equipment are determined, wherein each angle of arrival corresponds to a reference signal, e.g., the angle of arrival and the reference signal are in one-to-one correspondence. Of course, the present disclosure does not exclude other correspondence between the angle of arrival and the reference signal, which may also be one angle of arrival corresponding to multiple reference signals, or multiple angle of arrivals corresponding to one reference signal, etc.

In the present disclosure, the reference signal may be, for example, a SSB signal or a channel state information reference signal (CSI-RS).

At step S1402, a spherical coverage formed by each reference signal relative to the user equipment is obtained based on the determined anchor directions.

The user equipment may be rotated to obtain the spherical coverage formed by each reference signal relative to the user equipment. In addition, the spherical coverage formed by the reference signal relative to the user equipment may also be achieved by scanning and testing an angle of arrival to be measured on a spherical surface surrounding the user equipment.

A spatial relationship between a traffic channel of each of the multiple angle of arrivals and a downlink reference signal may be configured as a Quasi Co-Located type D.

In addition, traffic channels of different angle of arrivals among the multiple angle of arrivals may be configured for data transmission with different layer data streams.

The network node may receive, from the user equipment, angle information measured by the user equipment through radio resource management.

The anchor-based method of the present disclosure may be classified as single anchor method, a multiple anchor method, a backup multiple anchor method, etc. Detailed descriptions are provided below for each method.

For the single anchor method, the multiple angle of arrivals may have the same anchor direction. For the angle of arrival to be measured, other angle of arrivals than the angle of arrival to be measured among the multiple angle of arrivals are fixed as the anchor direction, and the angle of arrival to be measured is scanned and tested on a three-dimensional sphere per direction to obtain the spherical coverage formed by the corresponding reference signal relative to the user equipment The network node may determine an anchor direction for multiple angle of arrivals, and for each angle of arrival, the angle of arrival is fixed as the determined anchor direction and the other angle of arrivals are scanned on the 3D sphere per direction. The scanning and testing per direction on the three-dimensional sphere may be achieved either by scanning and testing the angle of arrival to be measured on the sphere surrounding the user equipment or by rotating the user equipment synchronized with the anchor direction in three dimensions at a fixed point.

For example, a unique anchor direction may be provided to apply to different angle of arrivals. This anchor direction may be selected as a beam peak direction, or other directions may be used or a declared specific direction may be used. Taking the spherical coverage of dual angle of arrivals as an example, the angle of arrival carrying a Reference Signal 1 (RS1) is fixed in the anchor direction, and then the angle of arrival carrying a Reference Signal 2 (RS2) is scanned and tested on the 3D sphere per direction to obtain the spherical coverage of the user equipment relative to the RS2. Next, the angle of arrival carrying the RS2 is fixed in the anchor direction, and then the angle of arrival carrying the RS1 is scanned and tested on the 3D sphere per direction to obtain the spherical coverage of the user equipment relative to the RS1.

This method is simple, reliable, and applicable to terminals with overlap of spherical coverage corresponding to different RSs.

For the multiple anchor method, each angle of arrival may have different anchor directions. For the angle of arrival to be measured, other angle of arrivals than the angle of arrival to be measured among the multiple angle of arrivals are fixed as anchor directions corresponding to the other angle of arrivals, and the angle of arrival to be measured is scanned and tested per direction on the 3D sphere to obtain the spherical coverage of the user equipment.

For multiple angle of arrivals, the network node may determine a multiple anchor directions, in which each angle of arrival has a corresponding anchor direction. For each angle of arrival, the network node fixes the angle of arrival as the corresponding anchor direction, and scans and tests the other angle of arrivals on the 3D sphere per direction.

For example, a separate anchor may be provided for the angle of arrival of each reference signal. Taking the spherical coverage of dual angle of arrivals as an example, the angle of arrival carrying the RS1 is fixed in an anchor direction 1, and then the angle of arrival carrying the RS2 is scanned and tested on the 3D sphere per direction to obtain the spherical coverage of the user equipment relative to the RS2. The angle of arrival carrying the RS2 is fixed in anchor direction 2, and then the angle of arrival carrying the RS1 is scanned and tested on the 3D sphere per direction, to obtain the spherical coverage of the user equipment relative to the RS1. The anchor direction 1 may be selected as a beam peak direction obtained under a single angle of arrival or a beam peak direction of the spherical coverage of the user equipment relative to the RS1, or other directions may be used or a declared specific direction may be used. The anchor direction 2 may be selected as a beam peak direction of the spherical coverage of the user equipment relative to the RS2, or other directions may be used or a declared specific direction may be used.

This method is widely adaptable and may be applied regardless of whether the spherical coverage corresponding to different RSs overlap or not.

For the backup multiple anchor method, the anchor direction may include a primary anchor direction and at least one secondary anchor direction, and an angle between the primary anchor direction and the secondary anchor direction is greater than an angle threshold. For the angle of arrival to be measured, angle of arrivals other than the angle of arrival to be measured among the multiple angle of arrivals are fixed as the primary anchor direction. In a case that a spatial angle between the primary anchor direction and the angle of arrival to be measured being scanned and tested is less than the angle threshold, the other angle of arrivals are switched from the primary anchor direction to the secondary anchor direction, and the scanning and test for the angle of arrival to be measured on the three-dimensional sphere is continued.

For each angle of arrival, the network node may fix the angle of arrival as the primary anchor direction and, when the spatial angle between the primary anchor direction and the other angle of arrival being scanned is less than the angle threshold, switch the angle of arrival from the primary anchor direction to the secondary anchor direction and continue to scan and test the other angle of arrivals on the 3D sphere. The angle threshold may be different for different angle of arrivals and may be reported to the network node by the user equipment through signaling or radio resource management measurement. The angle threshold may be set differently as needed.

For example, a primary anchor and a secondary anchor may be provided for each reference direction, and the angle between the primary and secondary anchors must be greater than a minimum angle requirement (e.g., the angle threshold). When the spatial angle between the primary anchor direction and the angle of arrival to be scanned and tested is less than the minimum angle requirement, the anchor is switched from the primary anchor to the secondary anchor and vice versa (from the secondary anchor to the primary anchor). Taking the spherical coverage with dual angle of arrivals as an example, the angle of arrival carrying the RS1 is fixed in a primary anchor direction 1, then the angle of arrival carrying the RS2 is scanned and tested on the 3D sphere per direction. When the angle between the primary anchor direction 1 and the angle of arrival corresponding to the RS2 is less than the minimum angle requirement, the anchor is switched from the primary anchor direction 1 to a secondary anchor direction 1, or vice versa, before the spherical coverage of the user equipment relative to the RS2 is obtained after completing the spherical scan. Next, the angle of arrival carrying the RS2 is fixed in a primary anchor direction 2, and then the angle of arrival carrying the RS1 is scanned and tested on the 3D sphere per direction. When the angle between the primary anchor direction 2 and the angle of arrival corresponding to the RS1 is less than the minimum angle requirement, the anchor is switched from the primary anchor direction 2 to a secondary anchor direction 2, or vice versa, before the spherical coverage of the user equipment relative to the RS1 is obtained after completing the spherical scan.

For terminals with the minimum angle requirement (e.g. minSupportedAngleDifference>0), this method avoids the performance degradation when the angle of arrival is smaller than the minimum angle requirement.

The above methods may be used in combination, for example, by applying the idea of primary and secondary anchors to the single anchor method, e.g., providing a unique pair of primary and secondary anchors for angle of arrivals of all reference signal to use.

For example, a unique anchor may be provided to apply in different angle of arrivals. The anchor may include primary and secondary anchors, and the angle between the primary and secondary anchors meets the angle requirement of the terminal. Taking the spherical coverage of dual angle of arrivals as an example, the angle of arrival carrying the RS1 is fixed in the primary anchor direction, and then the angle of arrival carrying the RS2 is scanned and tested on the 3D sphere per direction. When the angle between the primary anchor direction and the angle of arrival corresponding to the RS2 is less than the minimum angle requirement, the anchor is switched from the primary anchor direction to the secondary anchor direction before the spherical coverage of the user equipment relative to the RS2 is obtained after completing the spherical scan. Next, the angle of arrival carrying the RS2 is fixed in the primary anchor direction, and then the angle of arrival carrying the reference signal 1 (RS1) is scanned and tested on the 3D sphere per direction, when the angle between the primary anchor direction and the angle of arrival corresponding to the RS1 is less than the minimum angle requirement, the anchor is switched from the primary anchor direction to the secondary anchor direction and vice versa before the spherical coverage of the user equipment relative to the RS1 is obtained after completing the spherical scan.

According to another embodiment of the present disclosure, a method of distinguishing angle capabilities of different angle of arrivals supported by different terminals may be provided. Because of different spherical coverage ranges of different terminals, different orientations of antenna panel, and different space division multiplexing capabilities, the minimum angles between angle of arrivals that may be supported by different terminals in supporting reception and/or transmission in multiple angle of arrivals may be different. The network side is often non-co-located when configuring multiple angle of arrivals, thus making it difficult to obtain the current angle between angle of arrivals. This results in a blind spot in network scheduling. The present disclosure designs a terminal capability signaling to report the minimum angle between angle of arrivals that may be supported by the network terminal, and uses Radio Resource Management (RRM) measurement to report the current angles between different angle of arrivals of the network. The network side can preferably make a different decision when the current angle is less than the minimum angle.

In the present disclosure, the angle threshold may be pre-configured, or pre-defined, or transmitted by the user equipment via signaling.

The network node may obtain the angle threshold and/or the angles between different angle of arrivals from the user equipment. The angle threshold may be agreed by using a predefined fixed value. The angle threshold may vary for different terminals and different angle of arrivals.

For example, the network node may be informed of the minimum angle between angle of arrivals (e.g., the angle threshold) that the terminal can support by the terminal capability signaling minSupportedAngleDifference. The specific terminal capability signaling is given below.

| minSupportedAngleDifference-r18 Indicates the UE supported minimum angle difference of multiple AoAs for Reference Signals with different QCL type D for UEs supporting simultaneousReceptionDiffTypeD-r16. This value is in degree. | Band | No | N/A | FR2 only |
|---|---|---|---|---|

The above example is only exemplary, and the present disclosure is not limited to it.

It is assumed that the current angle between different angle of arrivals measured by the terminal is currentAngleDifference, when currentAngleDifference<minSupportedAngleDifference, the network node preferably does not configure multi-layer MIMO transmission in the different angle of arrivals. When currentAngleDifference<minSupportedAngleDifference occurs in test scenarios such as spherical coverage, the network simulator needs to adjust the anchor direction to meet the condition of currentAngleDifference>minSupportedAngleDifference, or skip the test in that direction.

Similarly, the user equipment may also report or declare an angle between optimal beam directions (or boresight of antenna panel) for different angle of arrivals. For example, when the angle is zero or less than a certain angle, such a terminal may be considered a typical terminal with spherical coverage in the multiple angle of arrivals similar to the spherical coverage in the single angle of arrival, thereby applying as many of the requirements and test directions, etc., of the single angle of arrival to the multiple angle of arrivals as possible.

FIG. 15 illustrates a flowchart of a communication method performed by a user equipment in a communication system provided in another embodiment of the present disclosure.

Because of different spherical coverage ranges of different terminals, different orientations of antenna panel, and different space division multiplexing capabilities, the minimum angles between angle of arrivals that may be supported by different terminals in supporting reception and/or transmission in multiple angle of arrivals may be different. The network side is often non-co-located when configuring multiple angle of arrivals, thus making it difficult to obtain the current angle between angle of arrivals. Therefore, according to the example embodiments, the user equipment may transmit a signaling including a minimum angle requirement to a network node such that the network node may know the minimum angle capability that may be supported by the user equipment.

Referring to FIG. 15, at step S1501, information on an angle threshold for different angle of arrivals is agreed by using a preset fixed value, or the information on the angle threshold for different angle of arrivals is transmitted to the network node by specific signaling. At step S1502, the information on the angle between different angle of arrivals is transmitted to the network node by radio resource management measurement. The above steps may be performed simultaneously.

In this way, the spherical coverage of the user equipment relative to each reference signal may be obtained based on the angle threshold and the angle between angle of arrivals, enabling the reception and/or transmission in multiple angle of arrivals.

In addition, the user equipment may also report or declare an angle between optimal beam directions (or boresight of antenna panel) for different angle of arrivals. For example, when the angle is zero or less than a certain angle, such a terminal may be considered a typical terminal with spherical coverage in the multiple angle of arrivals similar to the spherical coverage in the single angle of arrival, thereby applying as many of the requirements and test directions, etc., of the single angle of arrival to the multiple angle of arrivals as possible.

In order to solve the problem that the current total radiated power cannot reflect the actual performance of the multi-antenna terminal, the present disclosure provides a definition method and test steps for the total radiated power, which involves a requirement definition and test method of an envelope combined total radiated power of the multi-antenna terminal.

In the example embodiments, the total radiated power may be referred to as a Combined Total Radiated Power (Combined TRP) or an Envelop Combined Total Radiated Power (Envelop Combined TRP) according to its test principle, and in this disclosure, these terms are used interchangeably. Specifically, in the present disclosure, the total radiated power is not a TRP of a single antenna or a TRP in a particular transmitting state, but determined based on a TRP of the user equipment in different transmitting modes, or obtained by considering an Effective Isotropic Radiated Power (EIRP) in each spatial direction.

According to a method of the present disclosure, there is provided a method performed by a network node, the method may include obtaining respective first effective isotropic radiated powers (EIRPs) of a user equipment (UE) at respective test positions and in respective antenna transmitting modes, determining, based on the respective first EIRPs, a second EIRP corresponding to each test position, and determining a total radiated power (TRP) based on the second EIRP corresponding to each test position.

In the present disclosure, the network node may transmit at least two antenna transmitting mode information to the UE, and the UE transmits signals based on the at least two antenna transmitting mode information. Furthermore, the network node may not transmit the antenna mode information to the UE, and the UE transmits signals based on a predefined antenna transmitting mode.

In an example embodiment, the obtaining of the respective first EIRPs of the UE at the respective test positions and in the respective antenna transmitting modes may include transmitting at least two antenna transmitting mode information to the UE when the UE is in any one of the test positions, receiving, from the UE, a signal transmitted by the UE in that test position based on each of the at least two antenna transmitting mode information, and testing the corresponding first EIRP of the UE in each transmitting mode.

In an example embodiment, the obtaining of the first EIRPs of the UE at the respective test positions and in the respective antenna transmitting modes may include transmitting, to the UE, respective antenna transmitting mode information in sequence, for each antenna transmitting mode information, receiving, from the UE, signals transmitted by the UE in the respective test positions based on the antenna transmitting mode information, and testing the first EIRPs of the UE in the respective test positions and in the antenna transmitting mode.

In an example embodiment, the determining of the second EIRP corresponding to each test position based on the respective first EIRPs may include determining a maximum value of all first EIRPs corresponding to the test position as the second EIRP corresponding to the test position.

In an example embodiment, the determining of the TRP based on the second EIRP corresponding to each test position may include performing spherical integration on all second EIRPs corresponding to respective test positions to obtain the TRP.

As an example, the TRP may be indicated from two different perspectives:

From the perspective of different transmitting modes:

The user equipment can support many different transmitting modes, such as an antenna 1, an antenna 2 for the TAS, . . . , a TPMI1, a TPMI2 for the Uplink Multiple-Input Multiple Output (UL MIMO), . . . , a Transmit Diversity (TxD), a Beam 1, a Beam 2 for the millimeter wave, etc.

When the user equipment is in a certain transmitting mode, its EIRP distribution in the 3D space may form a specific antenna directional map pattern.

The antenna patterns corresponding to different transmitting modes in which the user equipment may be overlapped, the maximum value of EIRP is selected in each direction, that is, an envelope of each antenna pattern, and the envelope combined total radiated power is obtained after integration (for example, spherical integration).

Figure 16:
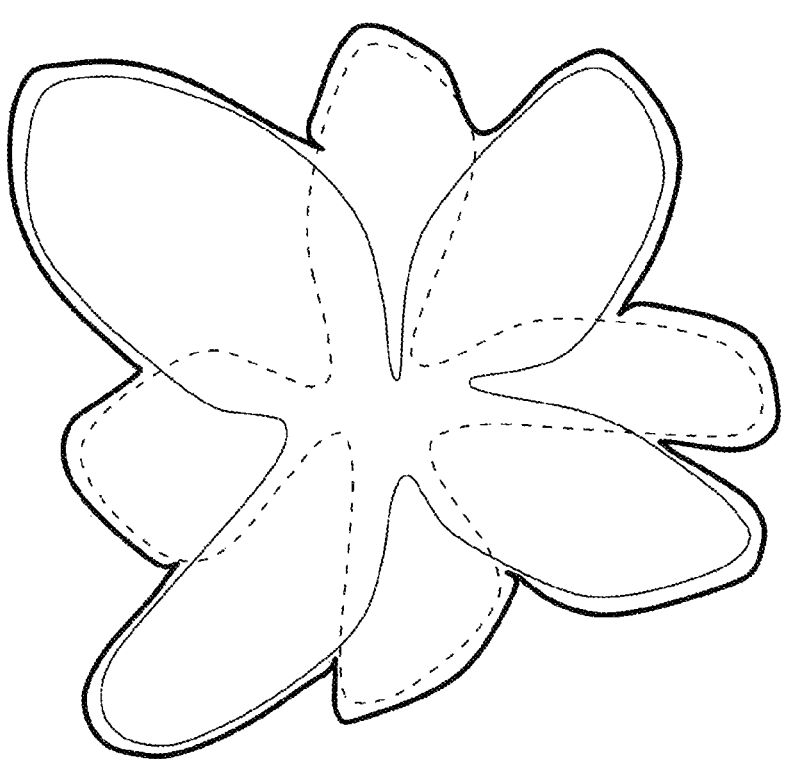
FIG. 16 illustrates a schematic diagram of an envelope combined total radiated power according to an example embodiment.

FIG. 16 illustrates a schematic diagram of an envelope combined total radiated power according to an embodiment of the present disclosure.

From the perspective of an overall antenna pattern:

For the EIRP in a particular spatial direction, the user equipment may have different EIRP performance in the case that the user equipment supports many different transmitting modes (e.g., the antenna 1, the antenna 2 for TAS, . . . , the transmit diversity TxD, the TPMI1, the TPMI2 for the UL MIMO, . . . , the Beam 1, the Beam 2 for the millimeter wave, etc.), and the maximum value of them is taken as the EIRP in that direction.

The maximum value of the EIRPs in various transmitting modes is taken in each of all three-dimensional space directions, and then the antenna pattern formed at this time is the radiated power envelope of the various transmitting modes.

The spherical integration may be performed on the maximum EIRP envelop to obtain the envelope combined total radiated power.

By measuring the EIRP values from various transmitting modes, it may solve the problem that in the case of the current FR2 millimeter wave terminal supporting multiple antenna elements and even multiple antenna modules, its TRP requirement is performed in the beamlock state so that the TRP can only characterize the total radiated power in a specific transmitting state. In fact, the millimeter wave terminal can support beam scanning, and its actual overall spatial radiated power is much better than the TRP in the beamlock state, and this method may determine the actual overall spatial radiated power more closely.

In an example embodiment, the obtaining of the respective first EIRPs of the UE at the respective test positions and in the respective antenna transmitting modes may include transmitting at least two antenna transmitting mode information to the UE when the UE is in any one of the test positions, receiving, from the UE, a signal transmitted by the UE in that test position based on each of the at least two antenna transmitting mode information, and testing the corresponding first EIRP of the UE in each transmitting mode.

In an example embodiment, the obtaining of the first EIRPs of the UE at the respective test positions and in the respective antenna transmitting modes may include transmitting, to the UE, respective antenna transmitting mode information in sequence, for each antenna transmitting mode information, receiving, from the UE, signals transmitted by the UE in the respective test positions based on the antenna transmitting mode information, and testing the first EIRPs of the UE in the respective test positions and in the antenna transmitting mode.

In an example embodiment, the determining of the second EIRP corresponding to each test position based on the respective first EIRPs may include determining a maximum value of all first EIRPs corresponding to the test position as the second EIRP corresponding to the test position.

In an example embodiment, the determining of the total radiated power (TRP) based on the second EIRP corresponding to each test position may include performing spherical integration on all second EIRPs corresponding to respective test positions to obtain the TRP.

The above two perspectives also reflect two different test methods and steps, as follows:

Method I:

1. For a test grid point $(\theta,\phi)$ in the three-dimensional space namely $EIRP_{mode1}(\theta,\phi)$, $EIRP_{mode2}(\theta,\phi)$, $EIRP_{mode3}(\theta,\phi)$, . . . .

1.1 EIRPs of the user equipment in different transmitting modes are tested,

Where the test grid point refers to a test position in the three-dimensional space, $(\theta,\phi)$ refers to spherical coordinates of the test position in the three-dimensional space, and the origin of this spherical coordinate system may be taken as the geometric center of the UE. mode1, mode2, . . . , represent a transmitting mode 1, a transmitting mode2 . . . supported by the user equipment, $EIRP_{mode1}(\theta,\phi)$ denotes the EIRP of the user equipment at the test grid point $(\theta,\phi)$ and in the transmitting mode 1, $EIRP_{mode2}(\theta,\phi)$ denotes the EIRP of the user equipment at the test grid point $(\theta,\phi)$ and in the transmitting mode 2, and so on.

1.2 The maximum value $EIRP_{max}(\theta,\phi)$ of the EIRPs in the respective transmitting modes is taken as the final EIRP corresponding to this test grid point.

In other embodiments, other algorithms may be used for the final EIRP in addition to taking the maximum value.

2. The test point is switched to a next test grid point and the step 1 above is repeated until all test grid points in the 3D space are traversed.

3. Spherical integration is performed on $EIRP_{max}(\theta,\phi)$ for all test grid points, and the envelope combined TRP is obtained.

At this point, the method is a method performed by a user equipment (UE) including the steps of obtaining at least two antenna transmitting mode information and transmitting signals with the at least two antenna transmitting modes respectively at respective test positions.

In various embodiments, the at least two antenna transmitting modes include at least one of transmitting with each antenna in the TAS supported by the UE, transmitting using a beam selected by beam refinement; transmitting in a TxD mode supported by the UE, and transmitting with each of all or some of the transmit precoding matrix indexes (TMPI indexes) configured by the System Simulator (SS).

Method II:

1. For one transmitting mode (mode1) of the user equipment 1.1 For a test grid point $(\theta,\phi)$ in the 3D space, the EIRP corresponding to that test grid point is obtained by test, e.g. $EIRP_{mode1}(\theta,\phi.)$ 1.2 Each test grid point in the 3D space is traversed by varying the values of $(\theta,\phi)$ to get $EIRP_{mode1}(\theta,\phi)$ of all grid points.

2. A next transmitting mode is switched, the above step 1 is repeated to get $EIRP_{mode2}(\theta,\phi)$, all transmitting modes are traversed, and the EIRPs of all grid points in all transmitting modes are obtained.

3. $EIRP_{max}(\theta,\phi)$ is obtained by finding the envelop of the EIRPs of all test grid points, then spherical integration is performed on $EIRP_{max}(\theta,\phi)$ to get the envelope combined TRP.

The new envelope combined total radiated power may be reflected as the following equation:

$$ecTRP = \frac{1}{4\pi} \int_{\theta=0}^{\pi} \int_{\phi=0}^{2\pi} [EIRP_{max}(\theta, \phi)] \sin(\theta) d\phi d\theta$$

where ecTRP denotes the envelope combined total radiated power.

where $EIRP_{max}(\theta,\phi) = \max \{EIRP_{mode1}(\theta,\phi)$, $EIRP_{mode2}(\theta,\phi)$, $EIRP_{mode3}(\theta,\phi)$, . . . }.

wherein, mode1, mode2, . . . represent the transmitting mode 1, the transmitting mode 2, . . . supported by the user equipment.

At this point, the method is a method performed by the user equipment (UE) including the steps of obtaining at least two antenna transmitting mode information in sequence, and transmitting signals according to the at least two antenna transmitting modes at respective test positions, respectively.

In various embodiments, the at least two antenna transmitting modes include at least one of transmitting with each antenna in the TAS supported by the UE, transmitting using a beam selected by beam refinement; transmitting in a TxD mode supported by the UE, and transmitting with each of all or some of the transmit precoding matrix indexes (TMPI indexes) configured by the System Simulator (SS).

The following embodiments are proposed to solve the problem that the requirement definition and test of the total radiated power does not characterize the performance brought by other antennas if it is based on a single antenna.

According to an aspect of the present disclosure, there is provided a method performed by a network node, where the method may include: obtaining respective first EIRPs of a User Equipment (UE) at respective test positions and in respective antenna transmitting modes, determining, based on the respective first EIRPs, a second EIRP corresponding to each test position, and determining a TRP based on the second EIRP corresponding to each test position. "Based on" as used herein covers based at least on.

Specific embodiments are described below for the case where the UE supports different antenna transmitting modes. The following specific embodiments can solve the problem that when more and more FR1 terminals support multiple antennas transmitting simultaneously, the traditional requirement definition and test of the total radiated power can no longer match the actual function of the terminals, and a new spatial radiated power design and the corresponding new test method are targeted.

An envelope combined total radiated power of the user equipment supporting the TAS function Some user equipment can support multiple antenna switching functions, and the TRP of any one of them is not a good representation of the antenna performance of the whole machine. For the actual total radiated performance of the user equipment supporting the TAS function, the envelope combined total radiated power may be defined to reflect it. The test steps are illustrated by taking the user equipment supporting two antenna switching as an example, as follows.

1. For a test grid point $(\theta,\phi)$ in the three-dimensional space:

1.1 The maximum power is transmitted by an antenna 1, and an EIRP is measured to obtain $EIRP_{antenna1}(\theta,\phi)$.

1.2 The maximum power is transmitted by an antenna 2, and an EIRP is measured to obtain $EIRP_{antenna2}(\theta,\phi)$.

1.3 The maximum EIRP of this test point is $EIRP_{max}(\theta,\phi)=\max(EIRP_{antenna1}(\theta,\phi), EIRP_{antenna2}(\theta,\phi))$.

where $EIRP_{antenna1}(\theta,\phi)$ denotes the EIRP of the user equipment at the test grid point $(\theta,\phi)$ when transmitting with the antenna 1, and $EIRP_{antenna2}(\theta,\phi)$ denotes the EIRP of the user equipment at the test grid point $(\theta,\phi)$ when transmitting with the antenna 2. For the case where the user equipment supports more antennas, the similar method above is used.

Note that the maximum power is only an example embodiment, and the person skilled in the art may also use other powers for transmitting.

2. The test point is switched to a next test grid point and the step 1 above is repeated until all test grid points in the three-dimensional space are traversed.

3. Spherical integration is performed on $EIRP_{max}(\theta,\phi)$ for all test grid points to obtain the envelope combined TRP.

It should be noted that the "the maximum power for transmitting" mentioned in this disclosure is only an example, and other powers for transmitting are also conceivable by those skilled in the art.

An envelope combined total radiated power for the user equipment supporting the beam correspondence function:

An antenna module of a millimeter wave terminal includes multiple antenna elements that allow beam scanning by controlling the phase. The terminal supports multiple beams, which is equivalent to supporting multiple transmitting modes. When testing its envelope combined total radiated power, it may be tested beam-by-beam according to the Method II mentioned in the part of "the envelope combined total radiated power of the multi-antenna terminal", but this method is very time-consuming, so it is possible that the user equipment uses the beam selected by beam refinement as the transmitting mode for generating EIRPmax according to the beam correspondence. The EIRP of each test grid point is measured according to the current steps of measuring EIRP spherical coverage, and only the spherical integration of EIRPmax of all test grid points is performed in the last step to obtain the envelope combination TRP.

An envelop combined total radiated power of the user equipment supporting the Transmit Diversity (TxD) function:

The transmit diversity is a network-side agnostic multi-antenna transmitting state, e.g., although the user equipment transmits with multiple antennas, it still appears to be a single antenna port with respect to the network side. Because it is not possible to configure multiple transmitting modes through the network node, while the transmit diversity is that the UE autonomously performs different antenna transmitting modes as the test position is changed, then the envelop combined total radiated power of the user equipment supporting the transmit diversity may be performed directly under the transmit diversity in accordance with the conventional TRP test procedure, and preferably, this test is performed in the test system where a measurement antenna and a communication antenna are in the same location. As an alternative embodiment, one measurement antenna and a plurality of communication antennas may be configured in the test, and the plurality of communication antennas may include a communication antenna at the same location as the measurement antenna and multiple communication antennas at different locations from the measurement antenna, with each combination of the measurement antenna and the communication antenna acting as one transmitting mode of the transmit diversity, and multiple combinations of the measurement antenna and the communication antenna are similar to multiple transmitting modes of the transmit diversity, so that the envelop combined TRP may be obtained from these multiple transmitting modes.

An envelop combined total radiated power of the user equipment supporting the uplink multiple-input multiple-output (UL MIMO) capability:

The UL MIMO is a network-side known multi-antenna transmit state, and the network node may enable the user equipment in different transmitting modes by configuring different transmit precoding matrix indexes (TPMI indexes). Taking a single-stream dual-antenna port UL MIMO as an example, the TPMI index is as follows: TPMI index=0 for a first antenna transmitting, TPMI index=1 for a second antenna transmitting, TPMI index=2~5 for two antennas transmitting at the same time but with different phases. Table 5 below shows precoding matrixes sorted from left to right in increasing order of TPMI.

TABLE 5

| TPMI index | W(which are sorted from left to right in increasing order of TPMI index) | | | | | | | |
|---|---|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | — | — |

Depending on the terminal capability, the user equipment can support some or all of the TPMI indexes in the above table, for example, a coherent terminal (coherent UE) can support all of the above, a non-coherent terminal (non-coherent UE) can support the TPMI indexes 0, 1 and 2 at most, but the worst terminal will also support the TPMI indexes 0 and 1.

Taking the coherent terminal as an example, its envelope combined total radiated power may be obtained by the following steps:

1. For a test grid point ($\theta,\phi$) in the three-dimensional space, the transmitting modes supported by the user equipment are tested separately 1.1 The maximum power is transmitted with the TPMI index 0, and an EIRP is measured to obtain $EIRP_{TPMI0}$ ($\theta,\phi$).

1.2 The maximum power is transmitted with the TPMI index 1, and an EIRP is measured to obtain $EIRP_{TPMI1}$ ($\theta,\phi$).

1.3 The maximum power is transmitted with the TPMI index 2 and an EIRP is measured to obtain $EIRP_{TPMI2}$ ($\theta,\phi$).

1.4 The maximum power is transmitted with the TPMI index 3 and an EIRP is measured to obtain $EIRP_{TPMI3}$ ($\theta,\phi$).

1.5 The maximum power is transmitted with the TPMI index 4 and an EIRP is measured to obtain $EIRP_{TPMI4}$ ($\theta,\phi$).

1.6 The maximum power is transmitted with the TPMI index 5 and an EIRP is measured to obtain $EIRP_{TPMI5}$ ($\theta,\phi$).

1.7 The maximum EIRP of this test point is $EIRP_{max}(\theta,\phi)$=max ($EIRP_{TPMI0}(\theta,\phi)$, $EIRP_{TPMI1}(\theta,\phi)$, $EIRP_{TPMI2}(\theta,\phi)$, $EIRP_{TPMI3}(\theta,\phi)$, $EIRP_{TPMI4}(\theta,\phi)$, $EIRP_{TPMI5}(\theta,\phi)$).

Where $EIRP_{TPMI0}(\theta,\phi)$ denotes the EIRP of the user equipment at the test grid point ($\theta,\phi$) when transmitting with the TPMI index 0, $EIRP_{TPMI1}(\theta,\phi)$ denotes the EIRP of the user equipment at the test grid point ($\theta,\phi$) when transmitting with the TPMI index 1, and so on.

Note that the maximum power is only an example embodiment, and the person skilled in the art may also use other power for transmitting.

2. The test point is switched to a next test grid point and the step 1 above is repeated until all test grid points in the three-dimensional space have been traversed.

3. Spherical integration is performed on $EIRP_{max}(\theta,\phi)$ for all test grid points to get the envelope combined TRP.

The test may also be performed according to Method II mentioned in the part of "the envelop combined total radiated power of the multi-antenna terminal".

The above examples are only a few typical implementations, and various combinations are within the scope of this disclosure.

Each embodiment herein may be used in combination with any other embodiment(s) described herein.

Figure 17:
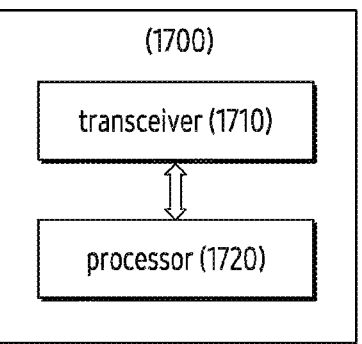
FIG. 17 illustrates a block diagram of a user equipment in a communication system provided by an example embodiment.

FIG. 17 illustrates a block diagram of a user equipment in a communication system provided by an embodiment of the present disclosure. Referring to FIG. 17, the user equipment 1700 may include a transceiver 1710 and a processor 1720, wherein the processor 1720 is coupled/connected, directly or indirectly, to the transceiver 1710 and configured to perform the communication method performed by the UE described above. Although the transceiver 1710 and the processor 1720 are shown as separate entities, they may be implemented as a single entity, such as a single chip. The transceiver 1710 and the processor 1720 may be electrically connected or coupled, directly or indirectly, to each other. The transceiver 1710 may transmit signals to and receive signals from other network nodes, such as a UE, a base station, a system simulator (such as a simulated base station), or a core network node. The processor 1720 may include one or more processing units and may control the user equipment to perform at least one operation and/or function according to the above embodiments.

Details of the UE or the operations of the method performed by the UE described above may refer to the description related to the user equipment and are not repeated here.

Figure 18:
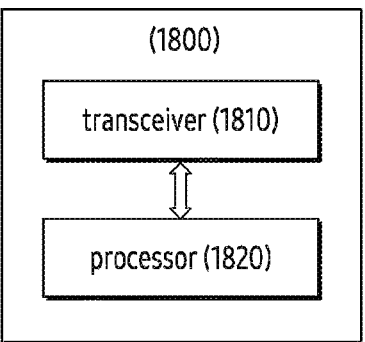
FIG. 18 illustrates a block diagram of a network node in a communication system provided by an example embodiment.

FIG. 18 illustrates a block diagram of a network node in a communication system provided by an embodiment of the present disclosure. Referring to FIG. 18, the network node 1800 may include a transceiver 1810 and a processor 1820, wherein the processor 1820 is coupled, directly or indirectly, to the transceiver 1810 and configured to perform the communication method performed by the network node described above. Although the transceiver 1810 and the processor 1820 are shown as separate entities, they may be implemented as a single entity, such as a single chip. The transceiver 1810 and the processor 1820 may be electrically connected or coupled, directly or indirectly, to each other. The transceiver 1810 may transmit signals to and receive signals from other network nodes, such as a UE, a base station, a system simulator (such as a simulated base station), or a core network node. The processor 1820 may include one or more processing units and may control the network node to perform at least one operation and/or function according to the above embodiments.

Details of the operations of the method performed by the base station described above may refer to the description related to the network node and are not repeated here.

According to the example embodiments, an electronic device is further provided, the device may include at least one processor and at least one memory storing computer-executable instructions, wherein the computer-executable instructions, when run by the at least one processor, cause the at least one processor to perform any one of the methods as described above.

As an example, the electronic device may be a PC computer, a tablet device, a personal digital assistant, a smartphone, or any other device capable of executing the above instruction set. Here, the electronic device does not have to be a single electronic device, but may also be any set of devices or circuits capable of executing the above instructions (or instruction set) individually or jointly. The electronic device may also be a part of an integrated control system or system manager, or may be configured as a portable electronic device that interfaces locally or remotely (e.g., via wireless transmission).

In the electronic device, the processor may include a central processing unit (CPU), graphics processing unit (GPU), programmable logic device, special purpose processor system, microcontroller or microprocessor. By way of example and not limitation, the processor may also include analog processors, digital processors, microprocessors, multi-core processors, processor arrays, network processors, and the like.

The processor may execute instructions or code stored in the memory, which may also store data. Instructions and data may also be sent and received over a network via a network interface, which may employ any known transport protocol.

The memory may be integrated with the processor, e.g., a RAM or flash memory is arranged within an integrated circuit microprocessor or the like. Additionally, the memory may include a separate device such as an external disk drive, storage array, or any other storage device that may be used by a database system. The memory and the processor may be operatively coupled, or may communicate with each other, e.g., through I/O ports, network connections, etc., to enable the processor to read files stored in the memory.

In addition, the electronic device may also include video displays (e.g. liquid crystal display) and user interaction interfaces (e.g. keyboard, mouse, touch input device, etc.). All components of the electronic device may be connected to, directly or indirectly, each other via a bus and/or a network.

According to an embodiment of the present disclosure, a computer readable storage medium storing instructions is also provided. The instructions, when executed by at least one processor, causes the at least one processor to perform any of the above methods according to the exemplary example embodiments. Examples of computer-readable storage media herein include: Read Only Memory (ROM), Random Access Programmable Read Only Memory (RAPROM), Electrically Erasable Programmable Read Only Memory (EEPROM), Random Access Memory (RAM), Dynamic Random Access Memory (DRAM), Static Random Access Memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blue-ray or optical disk storage, Hard Disk Drive (HDD), Solid State Drive (SSD), card storage (such as multimedia cards, secure digital (SD) cards or extremely fast digital (XD) cards), magnetic tapes, floppy disks, magneto-optical data storage devices, optical data storage devices, hard disks, solid state disks, and any other devices that are configured to store computer programs and any associated data, data files and data structures in a non-transitory manner and provide the computer programs and any associated data, data files and data structures to a processor or computer so that the processor or computer can execute the computer programs. The instructions or computer programs in the computer-readable storage medium described above may be executed in an environment deployed in a computer device, such as client, host, proxy device, server, etc. In addition, in one example, the computer programs and any associated data, data files, and data structures are distributed on a networked computer system, so that the computer programs and any associated data, data files, and data structures are stored, accessed and executed through one or more processors or computers in a distributed manner.

In order to introduce the requirements and tests of the beam correspondence in the idle and inactive states of FR2 millimeter wave communication, the present disclosure provides the methods for configuring the beam and power through radio; in addition, for FR2 millimeter wave terminals capable of receiving and/or transmitting in different directions simultaneously, the present disclosure provides the terminal requirement (including spherical coverage requirement) implementation and test methods based on different angle of arrivals.

It should be noted that the terms "first", "second", "third", "fourth", "1", "2", etc. (if present) used in the specification and claims and the accompanying drawings above of the present disclosure are used to distinguish similar objects and are not necessary for describing a particular order or sequence. It should be understood that the data so used is interchangeable in appropriate cases so that the example embodiments described herein may be implemented in an order other than that illustrated or described herein.

It should be understood that while the flowcharts of the example embodiments indicate the individual operational steps by arrows, the order of these implementation steps is not limited to the order indicated by the arrows. Unless explicitly stated herein, in some implementation scenarios of the example embodiments, the implementation steps in the respective flowcharts may be performed in other orders as desired. In addition, some or all of the steps in each flowchart may include multiple sub-steps or multiple stages based on actual implementation scenarios. Some or all of these sub-steps or stages may be executed at the same moment, and each of these sub-steps or stages may also be executed separately at different moments. In the scenarios where the execution moments are different, the order of execution of these sub-steps or stages may be flexibly configured according to the needs, and the embodiments of the present disclosure are not limited thereto.

The above description is only an optional implementation of part of the implementation scenarios of the present disclosure. It should be noted that for those ordinary skill in the art, other similar means of implementation based on the technical idea of the present disclosure, without departing from the technical idea of the present disclosure, also fall within the scope of protection of the embodiments of the present disclosure.

According to embodiments, a method performed by a User Equipment (UE) in a communication system, the method comprises obtaining a first message when the UE is in a connected state, wherein the first message comprises beamlock related information that can be applied in a non-connected state. The method comprises performing a corresponding beamlock related operation based on the beamlock related information when the UE is in the non-connected state.

In an embodiment, the beamlock related information comprises at least one of an indication message for maintaining, activating and/or de-activating the beamlock; duration information for maintaining and/or activating the beamlock; time delay information for activating and/or de-activating the beamlock; a message indicating in which state the UE maintains and/or activates the beamlock; information indicating a transmitting power of an uplink signal in the non-connected state; information of the uplink signal in the non-connected state; and a transmission running time of the uplink signal in the non-connected state.

In an embodiment, the duration information indicates a duration after the beamlock is activated.

In an embodiment, the time delay information indicates a time period from the moment when the UE receives the first message in the connected state to the moment when the beamlock is activated or de-activated, and/or a time period from the moment when the UE enters into the non-connected state to the moment when the beamlock is activated and/or de-activated.

In an embodiment, the message indicating in which state the UE maintains and/or activates the beamlock comprises at least one of a message indicating that the beamlock is maintained or activated in a case of entering into the non-connected state; and a message indicating that the beamlock is activated in a case of the UE receiving a particular command.

In an embodiment, the message indicating that the beamlock is maintained and/or activated in the case of entering into the non-connected state comprises at least one of a message indicating that the beamlock is maintained or activated in a case of entering into an inactive state; and a message indicating that the beamlock is maintained or activated in a case of entering into an idle state.

In an embodiment, the information indicating the transmitting power of the uplink signal in the non-connected state comprises at least one of a maximum transmitting power of the UE; a configured maximum transmitting power; an immediate transmitting power of the UE when the UE receives the first message; and an immediate transmitting power of the UE when the UE performs activating the beamlock.

In an embodiment, a beam for performing the beamlock related operation comprises a beam the UE is using at the time of receiving the first message, and/or a beam the UE is using at the time of performing the beamlock related operation.

In an embodiment, the beamlock related operation comprises at least one of an operation of activating the beamlock; an operation of de-activating the beamlock; and an operation of maintaining the beamlock.

In an embodiment, the operation of maintaining the beamlock comprises performing the beamlock operation when the UE receives the first message; and maintaining the beamlock operation in the connected state when the UE is in the non-connected state.

In an embodiment, a timing for performing the beamlock related operation comprises at least one of when the UE receives the first message; when the UE transmits an uplink signal for the first time in a next non-connected state; when the UE transmits a predefined number of uplink signals in the next non-connected state; when the UE detects that a transmitting power of the uplink signal reaches a configured maximum transmitting power; or when the UE reaches a predefined time delay or time delay information for activating the beamlock in the first message.

In an embodiment, a timing for de-activating the beamlock operation comprises at least one of when the UE receives a beamlock de-activation message; when the UE re-enters into the connected state; when the UE receives an msg2 message or an msg4 message; when the UE reaches a predefined beamlock duration or duration information for maintaining or activating the beamlock in the first message; or when the UE reaches a predefined time delay or time delay information for de-activating the beamlock in the first message.

According to embodiments, a method performed by a network node in a communication system, the method comprises transmitting a first message to a User Equipment (UE) in a connected state, wherein the first message comprises beamlock related information that may be applied to a non-connected state. The method comprises performing a corresponding measurement operation on the UE in the non-connected state, so that the UE can perform a corresponding beamlock related operation based on the beamlock related information in the non-connected state.

According to embodiments, a method performed by a network node in a communication system, the method comprises receiving an uplink signal transmitted by a User Equipment (UE) in a non-connected state. The method comprises determining, based on the received uplink signal, whether the UE is in a maximum transmitting power state.

According to embodiments, a method performed by a network node in a communication system, the method comprises obtaining respective first Effective Isotropic Radiated Powers (EIRPs) of a User Equipment (UE) at respective test positions and in respective antenna transmitting modes. The method comprises determining, based on the respective first EIRPs, a second EIRP corresponding to each test position. The method comprises determining a Total Radiated Power (TRP) based on the second EIRP corresponding to each test position.

According to embodiments, a method performed by a User Equipment (UE) in a communications system, the method comprises obtaining at least two antenna transmitting mode information in sequence. The method comprises transmitting signals in accordance with the at least two antenna transmitting modes at respective test positions, respectively.

According to embodiments, a method performed by a User Equipment (UE), the method comprises obtaining at least two antenna transmitting mode information. The method comprises transmitting signals with the at least two antenna transmitting modes respectively at respective test positions.

According to embodiments, a communication method performed by a network node, the method comprises determining anchor directions of multiple angle of arrivals for a user equipment, wherein each angle of arrival corresponds to a reference signal. The method comprises obtaining, based on the anchor directions, a spherical coverage formed by each reference signal relative to the user equipment.

According to embodiments, a User Equipment (UE), comprises a transceiver. The UE comprises a processor coupled to the transceiver. The processor is configured to obtain a first message when the UE is in a connected state. The first message comprises beamlock related information that can be applied in a non-connected state. The processor is configured to perform a corresponding beamlock related operation based on the beamlock related information when the UE is in the non-connected state.

According to embodiments, a method performed by a User Equipment (UE) in a communication system, the method comprises obtaining a first message in case that the UE is in a connected state, wherein the first message comprises beamlock related information applied in a non-connected state. The method comprises performing a beamlock related operation based on the beamlock related information in case that the UE is in the non-connected state.

In an embodiment, the beamlock related information comprises at least one of an indication message for maintaining, activating or de-activating the beamlock, duration information for maintaining or activating the beamlock, time delay information for activating or de-activating the beamlock, a message indicating in which state the UE maintains or activates the beamlock, information indicating a transmitting power of an uplink signal in the non-connected state, information of the uplink signal in the non-connected state or a transmission running time of the uplink signal in the non-connected state.

In an embodiment, the duration information indicates a duration after the beamlock is activated.

In an embodiment, the time delay information indicates a time period from the moment when the UE receives the first message in the connected state to the moment when the beamlock is activated or de-activated, or a time period from the moment when the UE enters into the non-connected state to the moment when the beamlock is activated or de-activated.

In an embodiment, the message indicating in which state the UE maintains or activates the beamlock comprises at least one of a message indicating that the beamlock is maintained or activated in a case of entering into the non-connected state; and a message indicating that the beamlock is activated in a case of the UE receiving a particular command.

In an embodiment, the message indicating that the beamlock is maintained or activated in the case of entering into the non-connected state comprises at least one of a message indicating that the beamlock is maintained or activated in a case of entering into an inactive state or a message indicating that the beamlock is maintained or activated in a case of entering into an idle state.

In an embodiment, the information indicating the transmitting power of the uplink signal in the non-connected state comprises at least one of a maximum transmitting power of the UE, a configured maximum transmitting power, an immediate transmitting power of the UE when the UE receives the first message, or an immediate transmitting power of the UE when the UE performs activating the beamlock.

In an embodiment, a beam for performing the beamlock related operation comprises a beam the UE is using at the time of receiving the first message, and/or a beam the UE is using at the time of performing the beamlock related operation.

In an embodiment, the beamlock related operation comprises at least one of an operation of activating the beamlock; an operation of de-activating the beamlock; or an operation of maintaining the beamlock.

In an embodiment, the operation of maintaining the beamlock comprises performing the beamlock operation in response to receiving the first message; and maintaining the beamlock operation in the connected state in case that the UE is in the non-connected state.

In an embodiment, a timing for performing the beamlock related operation comprises at least one of when the UE receives the first message; when the UE transmits an uplink signal for the first time in a next non-connected state; when the UE transmits a predefined number of uplink signals in the next non-connected state; when the UE detects that a transmitting power of the uplink signal reaches a configured maximum transmitting power; or when the UE reaches a predefined time delay or time delay information for activating the beamlock in the first message.

In an embodiment, a timing for de-activating the beamlock operation comprises at least one of when the UE receives a beamlock de-activation message; when the UE re-enters into the connected state from the non-connected state; when the UE receives an msg2 message or an msg4 message; when the UE reaches a predefined beamlock duration or duration information for maintaining or activating the beamlock in the first message; or when the UE reaches a predefined time delay or time delay information for de-activating the beamlock in the first message.

According to embodiments, a method performed by a network node in a communication system, the method comprises transmitting a first message to a User Equipment (UE) which is in a connected state, wherein the first message comprises beamlock related information that may be applied to a non-connected state. The method comprises performing a measurement operation on the UE which is in the non-connected state while the UE performs a beamlock related operation based on the beamlock related information in the non-connected state.

In an embodiment, the performing the measurement operation comprises receiving an uplink signal transmitted by the UE which is in the non-connected state; and determining, based on the received uplink signal, whether the UE is in a maximum transmitting power state.

According to embodiments, a method performed by a User Equipment (UE), the method comprises obtaining at least two antenna transmitting mode information. The method comprises transmitting signals with the at least two antenna transmitting modes respectively at respective test positions.

According to embodiments, a method performed by a network node, the method comprises determining anchor directions of multiple angle of arrivals for a user equipment, wherein each angle of arrival corresponds to a reference signal. The method comprises obtaining, based on the anchor directions, a spherical coverage formed by each reference signal relative to the user equipment.

According to embodiments, a User Equipment (UE), comprises a transceiver. The UE comprises a processor coupled to the transceiver. The processor is configured to obtain a first message in case that the UE is in a connected state, wherein the first message comprises beamlock related information that can be applied in a non-connected state. The processor is configured to perform a beamlock related operation based on the beamlock related information in case that the UE is in the non-connected state.

In an embodiment, the beamlock related information comprises at least one of an indication message for maintaining, activating or de-activating the beamlock; duration information for maintaining or activating the beamlock; time delay information for activating or de-activating the beamlock; a message indicating in which state the UE maintains or activates the beamlock; information indicating a transmitting power of an uplink signal in the non-connected state; information of the uplink signal in the non-connected state; or a transmission running time of the uplink signal in the non-connected state.

In an embodiment, the duration information indicates a duration after the beamlock is activated.

In an embodiment, the time delay information indicates a time period from the moment when the UE receives the first message in the connected state to the moment when the beamlock is activated or de-activated, or a time period from the moment when the UE enters into the non-connected state to the moment when the beamlock is activated or de-activated.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a User Equipment (UE) in a communication system, the method comprising:

obtaining a first message in case that the UE is in a connected state, wherein the first message comprises beamlock related information applied in a non-connected state; and performing a beamlock related operation based on the beamlock related information in case that the UE is in the non-connected state.

2. The method of claim 1, wherein the beamlock related information comprises at least one of:

an indication message for maintaining, activating or de-activating the beamlock;

duration information for maintaining or activating the beamlock;

time delay information for activating or de-activating the beamlock;

a message indicating in which state the UE maintains or activates the beamlock;

information indicating a transmitting power of an uplink signal in the non-connected state;

information of the uplink signal in the non-connected state; or a transmission running time of the uplink signal in the non-connected state.

3. The method of claim 2, wherein the duration information indicates a duration after the beamlock is activated.

4. The method of claim 2, wherein the time delay information indicates a time period from a moment when the UE receives the first message in the connected state to a moment when the beamlock is activated or de-activated, and/or a time period from a moment when the UE enters into the non-connected state to a moment when the beamlock is activated or de-activated.

5. The method of claim 2, wherein the message indicating in which state the UE maintains or activates the beamlock comprises at least one of:

a message indicating that the beamlock is maintained or activated in a case of entering into the non-connected state; or a message indicating that the beamlock is activated in a case of the UE receiving a particular command.

6. The method of claim 5, wherein the message indicating that the beamlock is maintained or activated in the case of entering into the non-connected state comprises at least one of:

a message indicating that the beamlock is maintained or activated in a case of entering into an inactive state; or a message indicating that the beamlock is maintained or activated in a case of entering into an idle state.

7. The method of claim 2, wherein the information indicating the transmitting power of the uplink signal in the non-connected state comprises at least one of:

a maximum transmitting power of the UE;

a configured maximum transmitting power;

an immediate transmitting power of the UE when the UE receives the first message; or an immediate transmitting power of the UE when the UE performs activating the beamlock.

8. The method of claim 1, wherein a beam for performing the beamlock related operation comprises:

a beam the UE is using when receiving the first message, and/or a beam the UE is using when performing the beamlock related operation.

9. The method of claim 1, wherein the beamlock related operation comprises at least one of:

an operation of activating the beamlock;

an operation of de-activating the beamlock; or an operation of maintaining the beamlock.

10. The method of claim 9, wherein the operation of maintaining the beamlock comprises:

performing the beamlock operation in response to receiving the first message; and maintaining the beamlock operation in the connected state in case that the UE is in the non-connected state.

11. The method of claim 1, wherein a timing for performing the beamlock related operation comprises at least one of:

when the UE receives the first message;

when the UE transmits an initial uplink signal in a next non-connected state; when the UE transmits a pre-defined number of uplink signals in the next non-connected state;

when the UE detects that a transmitting power of the uplink signal reaches a configured maximum transmitting power; or when the UE reaches a predefined time delay or time delay information for activating the beamlock in the first message.

12. The method of claim 9, wherein a timing for de-activating the beamlock operation comprises at least one of:

when the UE receives a beamlock de-activation message;

when the UE re-enters into the connected state from the non-connected state;

when the UE receives an msg2 message or an msg4 message;

when the UE reaches a predefined beamlock duration or duration information for maintaining or activating the beamlock in the first message; or when the UE reaches a predefined time delay or time delay information for de-activating the beamlock in the first message.

13. A method performed by a network node in a communication system, the method comprising:

transmitting a first message to a User Equipment (UE) which is in a connected state, wherein the first message comprises beamlock related information that may be applied to a non-connected state; and performing a measurement operation on the UE which is in the non-connected state while the UE performs a beamlock related operation based on the beamlock related information in the non-connected state.

14. The method of claim 13, wherein the performing the measurement operation comprises:

receiving an uplink signal transmitted by the UE which is in the non-connected state; and determining, based on the received uplink signal, whether the UE is in a maximum transmitting power state.

15. A User Equipment (UE), comprising:

a transceiver; and a processor coupled to the transceiver and configured to:

obtain a first message in case that the UE is in a connected state, wherein the first message comprises beamlock related information that can be applied in a non-connected state; and perform a beamlock related operation based on the beamlock related information in case that the UE is in the non-connected state.

16. The UE of claim 15, wherein the beamlock related information comprises at least one of:

an indication message for maintaining, activating or de-activating the beamlock;

61 duration information for maintaining or activating the
beamlock;

time delay information for activating or de-activating the
beamlock;

a message indicating in which state the UE maintains or
activates the beamlock;

information indicating a transmitting power of an uplink
signal in the non-connected state;

information of the uplink signal in the non-connected
state; or a transmission running time of the uplink signal in the
non-connected state.

17. The UE of claim 16, wherein the duration information
indicates a duration after the beamlock is activated.

18. The UE of claim 17, wherein the time delay infor-
mation indicates a time period from a moment when the UE
receives the first message in the connected state to a moment
when the beamlock is activated or de-activated, and/or a
time period from a moment when the UE enters into the
non-connected state to a moment when the beamlock is
activated or de-activated.

\* \* \* \* \*

62